US006208752B1

(12) United States Patent
Palmadesso et al.

(10) Patent No.: US 6,208,752 B1
(45) Date of Patent: Mar. 27, 2001

(54) SYSTEM FOR ELIMINATING OR REDUCING EXEMPLAR EFFECTS IN MULTISPECTRAL OR HYPERSPECTRAL SENSORS

(75) Inventors: Peter J. Palmadesso, Manassas, VA (US); John A. Antoniades, Fulton; Mark M. Baumback, University Park, both of MD (US); Jeffrey H. Bowles, Alexandria; John M. Grossmann, Falls Church, both of VA (US); Daniel G. Haas, Lothian, MD (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 09/038,925

(22) Filed: Mar. 12, 1998

(51) Int. Cl.[7] .................................................. G06K 9/36
(52) U.S. Cl. .......................................... 382/155; 382/191
(58) Field of Search ............................. 382/155, 159, 382/160, 191, 225, 275

(56) References Cited

U.S. PATENT DOCUMENTS

| | | | | |
|---|---|---|---|---|
| 4,731,859 | * | 3/1988 | Holter et al. ........................ | 382/56 |
| 5,371,542 | * | 12/1994 | Pauli et al. ......................... | 348/262 |
| 5,561,667 | * | 10/1996 | Gerlach ............................. | 370/32.1 |
| 5,805,742 | * | 9/1998 | Whitsitt ............................. | 382/275 |

OTHER PUBLICATIONS

Kneubuehler et al., "Comparison of Different Approaches of Selecting Endmembers to Classify Agricultural Land by Means of Hyperspectral Data (DAIS7915)," *IEEE Proc. 1988 Geoscience and Remote Sensing Symp.*, Jul. 6–10 1988, pp. 888–890.*

Anser et al., "Unmixing the Directional Reflectances of AVHRR Sub–Pixel Landcovers," *IEEE Trans. on Geoscience and Remote Sensing*, vol. 35, No. 4, Jul. 1997, pp. 868–878.*

Carlotto, "Non–Linear Mixture Model and Application for Enhanced Resolution Multispectral Classification," *IEEE Proc. 1995 Geoscience and Remote Sensing Symp.*, Jul. 10–14, 1995, pp. 1168–1170.*

Smith et al., "A New Approach to Quantifying Abundances of Materials in Multispectral Images," *IEEE Proc. 1994 Geoscience and Remote Sensing Symp.*, Aug. 8–12, 1994, pp. 2372–2374.*

* cited by examiner

*Primary Examiner*—Andrew W. Johns
(74) *Attorney, Agent, or Firm*—John J. Karasek; George Legg

(57) ABSTRACT

The Intelligent Hypersensor Processing System (IHPS) is a system for the rapid detection of small, weak, or hidden objects, substances, or patterns embedded in complex backgrounds, providing fast adaptive processing for demixing and recognizing patterns or signatures in data provided by certain types of "hypersensors". SERENE introduces an improved noise reduction algorithm useful on systems which use hypersensors such as IHPS, or other systems which use sensors which are hyper or multi spectral. The SERENE technique may be employed through out the Learning Module Processor pipelining and further processes the data stream to filter intrinsic and extrinsic noise, and minimize exemplar noise effects in the exemplar set. This system represents an alternative to prior systems for hidden object detection by solving the problems encountered when attempting to detect hidden objects/targets in dynamic scenarios at real-time.

29 Claims, 13 Drawing Sheets

SYSTEM FOR ELIMINATING OR REDUCING EXEMPLAR EFFECTS IN MULTISPECTRAL OR HYPERSPECTRAL SENSORS

BACKGROUND OF THE INVENTION

The present invention relates generally to processing multi-dimensional signals from certain types of sensors, and more particularly to a system for reducing the effects of noise carried on this type of signal.

Historically there have been three types of approaches to the problems relating to the detection of objects, substances or patterns embedded in complex backgrounds. The first approach has been to use low dimensional sensor systems which attempt to detect a clean signature of a well known target in some small, carefully chosen subset of all possible attributes, e.g., one or a few spectral bands. These systems generally have difficulty when the target signature is heavily mixed in with other signals, so they typically can detect subpixel targets or minority chemical constituents of a mixture only under ideal conditions, if at all. The target generally must fill at least one pixel, or be dominant in some other sense as in some hyperspectral bands. Also, the optimal choice of bands may vary with the observing conditions or background (e.g. weather and lighting), so such systems work best in stable, predictable environments. These systems are simpler than the high dimensional sensors (hypersensors), but they also tend to be less sensitive to subdominant targets and less adaptable.

A hypersensor is a sensor which produces as its output a high dimensional vector or matrix consisting of many separate elements, each of which is a measurement of a different attribute of the system or scene under consideration. A hyperspectral imager is an example of a hypersensor. Hypersensors based on acoustic or other types of signals, or combinations of different types of input signals are also possible.

The second approach has been to employ high dimensional systems or hypersensors which seek to detect well known (prespecified) targets in complex backgrounds by using Principle Components Analysis (PCA) or similar linear methods to construct a representation of the background. Orthogonal projection methods are then used to separate the target from the background. This approach has several disadvantages. The methods used to characterize the background are typically not 'real time algorithms'; they are relatively slow, and must operate on the entire data set at once, and hence are better suited to post-processing than real time operation. The background characterization can get confused if the target is present in a statistically significant measure when the background is being studied, causing the process to fail. Also, the appearance of the target signature may vary with the environmental conditions: this must be accounted for in advance, and it is generally very difficult to do. Finally, these PCA methods are not well suited for detecting and describing unanticipated targets, (objects or substances which have not been prespecified in detail, but which may be important) because the representation of the background constructed by these methods mix the properties of the actual scene constituents in an unphysical and unpredictable way.

The more recent approach, is based on conventional convex set methods, which attempt to address the 'endmember' problem. The endmembers are a set of basis signatures from which every observed spectra in the dataset can be composed in the form of a convex combination, i.e., a weighted sum with non-negative coefficients The non-negativity condition insures that the sum can sensibly be interpreted as a mixture of spectra, which cannot contain negative fractions of any ingredient. Thus every data vector is, to within some error tolerance, a mixture of endmembers. If the endmembers are properly constructed, they represent approximations to the signature patterns of the actual constituents of the scene being observed. Orthogonal projection techniques are used to demix each data vector into its constituent endmembers. These techniques are conceptually the most powerful of the previous approaches, but current methods for implementing the convex set ideas are slow, (not real time methods) and cannot handle high dimensional pattern spaces. This last problem is a serious limitation, and renders these methods unsuitable for detecting weak targets, since every constituent of a scene which is more dominant than the target must be accounted for in the endmember set, making weak target problems high dimensional. In addition, current convex set methods give priority to the constituents of the scene which are dominant in terms of frequency of occurrence, with a tendency to ignore signature patterns which are clearly above the noise but infrequent in the data set. This makes them unsuitable for detecting strong but small targets unless the target patterns are fully prespecified in advance.

SUMMARY OF THE INVENTION

Accordingly, it is an object of this invention to provide a system for the detection of weak or hidden objects or substances embedded in complex backgrounds.

Another object of this invention is to provide an algorithm which is useful on IHPS or other hyper and multidimensional systems to further reduce the effects of intrinsic and extrinsic noise while maintaining the resolution and efficiency of the system.

Another object of this invention is to quickly and accurately detect hidden objects, substances or patterns embedded in complex backgrounds via the use of acoustic or other types of hypersensors.

Another object of this invention is to provide an efficient system for signal processing capable of handling multidimensional analysis by employing a set of fast algorithms which greatly reduces the computational burden in comparison to existing methods.

Another object of this invention is to provide a system for processing signals from hypersensors which offers true real time operation in a dynamic scenario.

A further object of this invention to provide a system for the detecting of weak or hidden objects or substances embedded in complex backgrounds which offers an adaptive learning capability.

These and additional objects of this invention are accomplished by the structures and processes hereinafter described.

SERENE introduces an improved noise reduction technique useful on systems which use hypersensors such as IHPS, or other systems which use sensors which are hyper or multi spectral.

The SERENE technique comprises the following:

1) Performing an autocorrelation test on the data vector input from the sensor to determine if the signal contains an unacceptably high percentage of noise; data vectors which fail to meet the S/N threshold are discarded.

2) Performing a scaled $\epsilon$ type comparison on the vector and discarding those which fail to meet the S/N threshold.

3) Performing an autocorrelation test on a difference vector defined by the difference in the vector value from step 2 and the exemplar or another designated vectors.

SERENE may be employed through out the Adaptive Learning Module Processor pipeline and further processes the data stream to filter intrinsic and extrinsic noise, and minimize exemplar noise effects in the survivor set.

DETAILED DESCRIPTION

In a preferred embodiment the SERENE technique is integrated into the existing IHPS system employed on an aircraft or spacecraft. As the craft flies over or in close proximity to an area of interest, the Hypersensor scans the scene or area of interest by taking successive snapshots of the scene below. Each snapshot constitutes a frame of spectral data. The spectral data is scanned frame by frame and displayed as variations in intensity.

In the optical example, a frame is the diffracted image on a 2 dimensional focal plane of a narrow slit which accepts light fromn a narrow linear strip of the scene. Variations of the optical sensor layout are possible.

Figure 1:
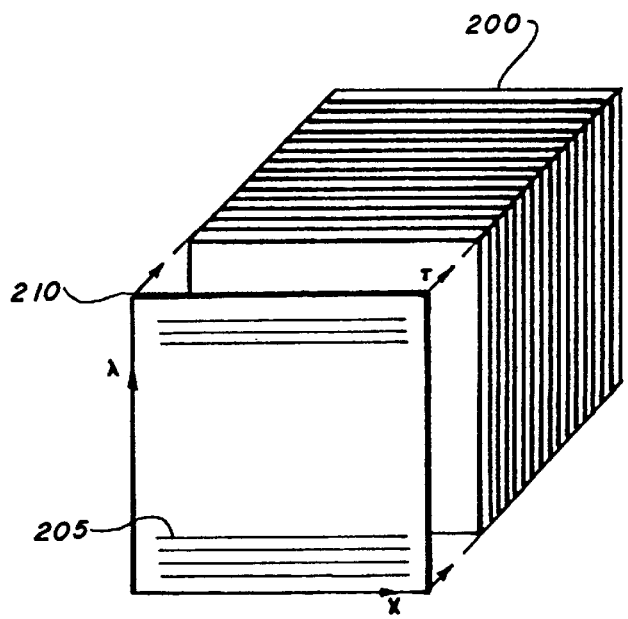
FIG. 1 is a representation of the data cube and the orientation of the spatial and wavelength information in X, $\lambda$ and T coordinates.

IHPS forms a series of pattern vectors through the concatenation of the outputs of multiple sensors. Each sensor measures a different attribute of the system being observed, and has a consistent relationship to all the other sensors, throughout the several views, FIG. 1 illustrates a representation of the data cube and the orientation of the spatial and wavelength information. Data cube 200, is created by the concatenation of successive frames 210 (different spatial strips) and represents the observed spectral data of the scene provided by the hypersensor. Each frame 210 comprises multiple lines 205; each line 205 being the spectral characteristic for a specific point in the scene which correlates to a specific coordinate of the area scanned. Frame 210 is configured such that the spatial information is expressed along the X axis and wavelength information is contained in the Z direction. The observed spectral data, which is used to create data cube 200 is expressed in vector form, and processed one spatial pixel, i.e. one spectrum, at a time. Each pixel is fed into a preprocessor (not shown) which performs normalization and purges bad spectral data, bad spectral data being data corrupted or otherwise useless due to incomplete spectral information.

Figure 2:
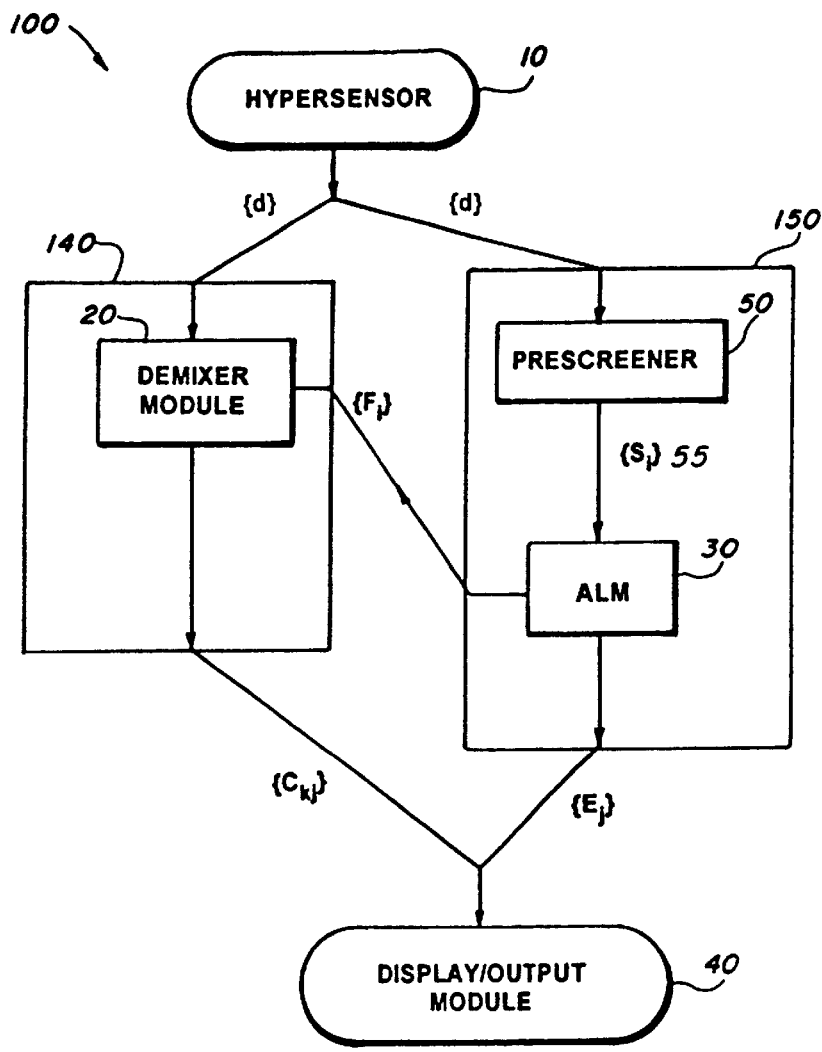
FIG. 2 is a block diagram of the preferred embodiment showing the system's parallel structure

Referring now to FIG. 2, which shows a block diagram of the basic IHPS system architecture, data from the sensors d 200 is entered into a processing system 100 which employs a parallel-pipeline architecture. Hypersensor 10 collects data and simultaneously transmits the collected data d 200 through two separate processor pipes, one for demixing 140, and one for adaptive learning operations 150. In demixer pipeline 140, demixer module 20, decomposes each pattern vector into a convex combination of a set of fundamental patterns E which are the constituents of the mixture. The decomposition is accomplished using projection operations called 'Filter Vectors' F generated in adaptive learning pipeline 150, by adaptive learning module 30.

Prescreener 50 constructs a survivor set/exemplar set {S} by extracting exemplars/survivors, or data collected by hypersensor 10 which may contain new or useful information. The signature pattern of a weak constituent or an unresolved small target is separated from background patterns which may hide the target pattern in the unmixed data. A priori knowledge about the signatures of known targets can be used, and approximate signatures of unknown constituents are determined automatically. Information detailing the composition of the demixed data patterns is sent to Output Module 40, along with information about the fundamental patterns c and Filter Vectors F. Learning module 30, performs minimization operations and projects the exemplar set information into a reduced dimensional space, generating endmembers E and filter vectors F.

For other types of hypersensors, the spectral vectors produced by the sensor array would be replaced by a vector of other types of data elements, such as the amplitudes of different frequencies of sound. The organization of input data vectors may also vary somewhat depending on the type of sensor. Aside from these sensor-dependent variations in the type and organization of the input data, the operation, capabilities, and output of the processing system would remain the same.

The parallel processing architecture illustrated in the FIG. 2 is a preferred structure, however, this system, algorithms and hardware contained herein may be employed in a system with a traditional architecture. Demixer processor pipeline 140 comprises demixer module 20 which decomposes each data vector $d_k$ into a convex combination of a set of fundamental patterns, which are endmembers or constituents of the mixture. The decomposition is accomplished using projection operators called 'Filter Vectors' generated by adaptive learning module 30.

Filter vectors are the column vectors of minimum magnitude constituting matrix F such that:

$$\underline{\underline{F}}^T \underline{\underline{E}} = \underline{\underline{I}}$$

L is the identity matrix, and E is the matrix whose columns are the endmember vectors. If the vector space defined by the endmembers is N dimensional, and each data vector d is a convex combination of the endmembers plus a noise vector N, then:

$$d = c_1 E_1 + c_2 E_2 + \ldots + c_n E_n + N \quad (1)$$

Where $c_1, c_2, \ldots, c_n$ are real, non-negative, numbers, and $E_1, E_2, \ldots, E_n$ are the endmember vectors of the system. Stated alternatively:

$$d = \underline{\underline{E}} c + N$$

Where c is the column vector whose elements are $c_1, c_2, \ldots, c_n$.

Filter vectors allow the signature pattern of a weak constituent or unresolved small target to be separated from known background patterns which may hide the target pattern in the spectral data. Filter vectors demix the spectrum by projecting out one endmember at a time.

Information c detailing the composition of the demixed data spectrum is sent to Display/Output module 40, along with the information about the fundamental spectra patterns, and filter vectors from adaptive learning module 30. Display/Output module 40, displays the distribution of the constituents of the scene, or transmits or stores the demixed data for later analysis.

Figure 3:
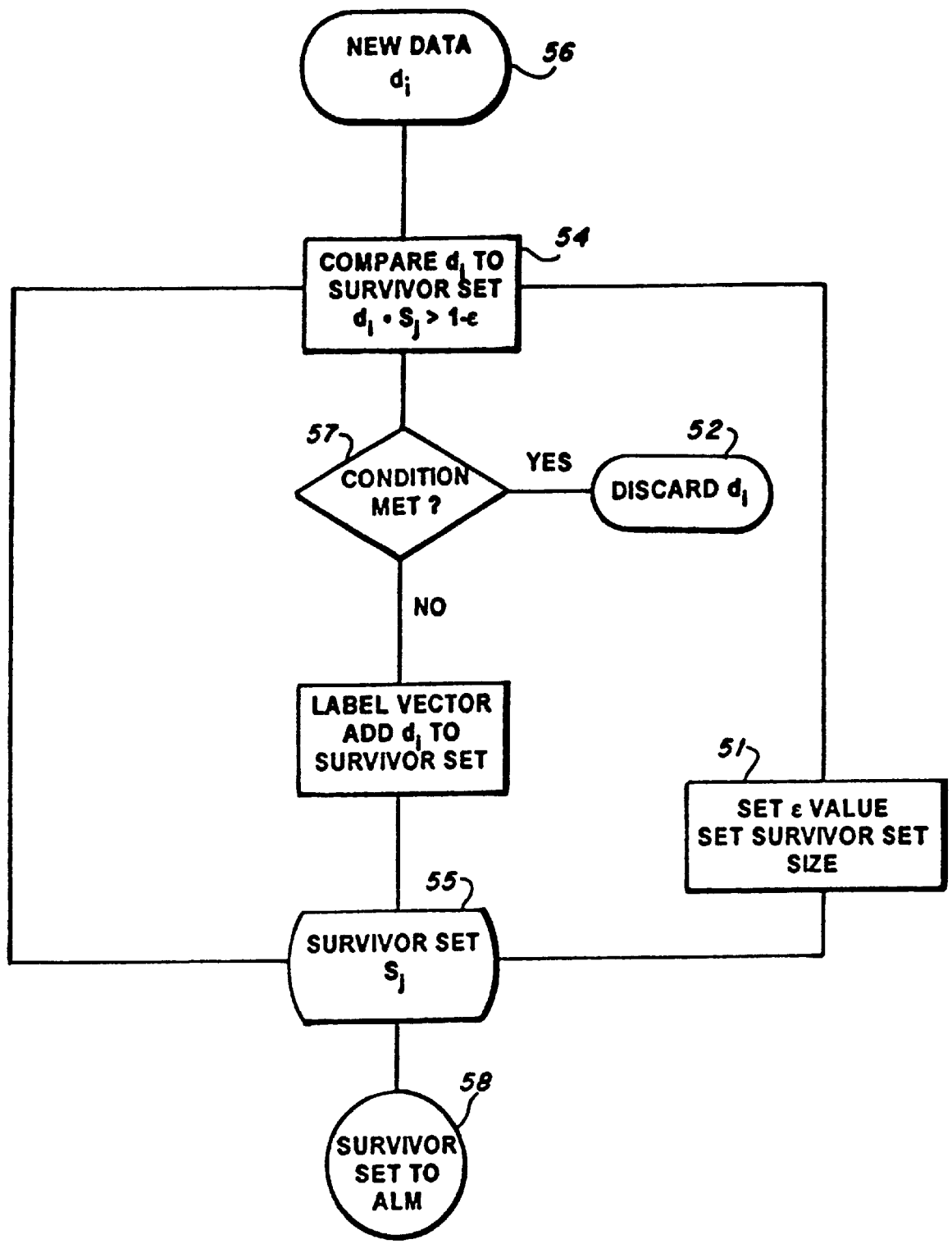
FIG. 3 is a logic flowchart of the operation of the prescreener

The second processor pipe 150 comprises prescreener 50, and adaptive learning module 30. Referring now to FIG. 3, prescreener 50 receives data vectors from preprocessor (not shown) and generates a reduced set of vectors called the exemplar set 55. The exemplar set members are referred to as exemplars. Exemplar set 55 is then transmitted to adaptive learning module 30. Prescreener 50 reduces the amount of data processed by discarding spectral signatures which have been seen before within the set error criteria 57, 52 and therefore contain no new information. This step reduces the computational burden on the other elements of the learning pipeline. Exemplar set 55 is generally about 1000 vectors in size however the size of the exemplar set 55 can vary depending upon the conditions and applications.

Prescreener 50 generates the exemplar set by comparing 54 the data spectra of the most recent pixel sampled with existing exemplars 55. The exemplar set is generated by performing dot operations in accordance to the relation:

$$d_i \cdot S_j > 1 - \epsilon \quad (2)$$

where, $d_i$ is the newly sampled data, $S_j$ is an existing exemplar set vector j=the jth exemplar, and $\epsilon$ is variable controlling noise sensitivity. Here, the vectors $d_i$ and $S_j$ are assumed to be normalized to unit magnitude. Thus, the condition $d_i \cdot S_j = 1$ means that the two vectors are identical and the condition $d_i \cdot S_j > 1 - \epsilon$ means that they are almost identical if $\epsilon$ is small. Vectors for $d_i$ which meet the above condition for any exemplar $S_j$ are discarded 52 and the next vector is examined. Discarded vectors are not included in the exemplar set. The value of $\epsilon$, which is set by the operator or a control system, is a function of the exemplar set size desired, memory length for exemplar set values, desired thruput of data and the noise in the signal 56. Generally, as the value of $\epsilon$ is increased, the sensitivity of the system is decreased.

The exemplar set vector, $S_j$, used for the above comparison is preferably chosen via the use of a structured search technique to minimize the number of dot operations while offering thorough analysis of the exemplar set 55. This may be accomplished by comparing 54 the newly sampled data vector with the most recent vectors entered into the exemplar set. Other search methods which minimize the number of operations necessary for thorough matching are also suitable.

Figure 5:
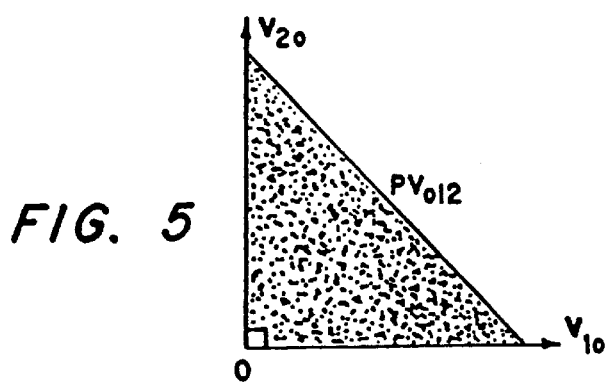
FIG. 5 is a representation of the orthogonal projections $V_{10}$ and $V_{20}$ during Gram-Schmidt operations.

FIG. 5 illustrates the flowchart of the logical operation of prescreener 50. The pruner 51 is a memory management device which determines when an exemplar set vector should be purged from the memory. Pruner 51 monitors exemplar set 55, and adjusts the control parameters to control exemplar set size. This is accomplished by setting the value for $\epsilon$ 54, and the maximum allowed age of an exemplar, which determines the threshold for additions to the exemplar set and the time an exemplar is allowed to remain in the exemplar set without being regenerated.

Inevitably, exemplar set 55, constructed as described above is contaminated by noise, which adversely affects the learning process performed in Learning module 30.

In a preferred embodiment the SERENE technique is implemented in prescreener module 50. In this embodiment SERENE operates as a control system to set the value of the threshold $\epsilon$ used in generating the exemplar set as discussed above. SERENE employs 3 separate tests on the data vectors, during the prescreening process of selecting exemplars. Each of the three tests are progressively more sensitive to noise contamination of the signal.

Figure 14:
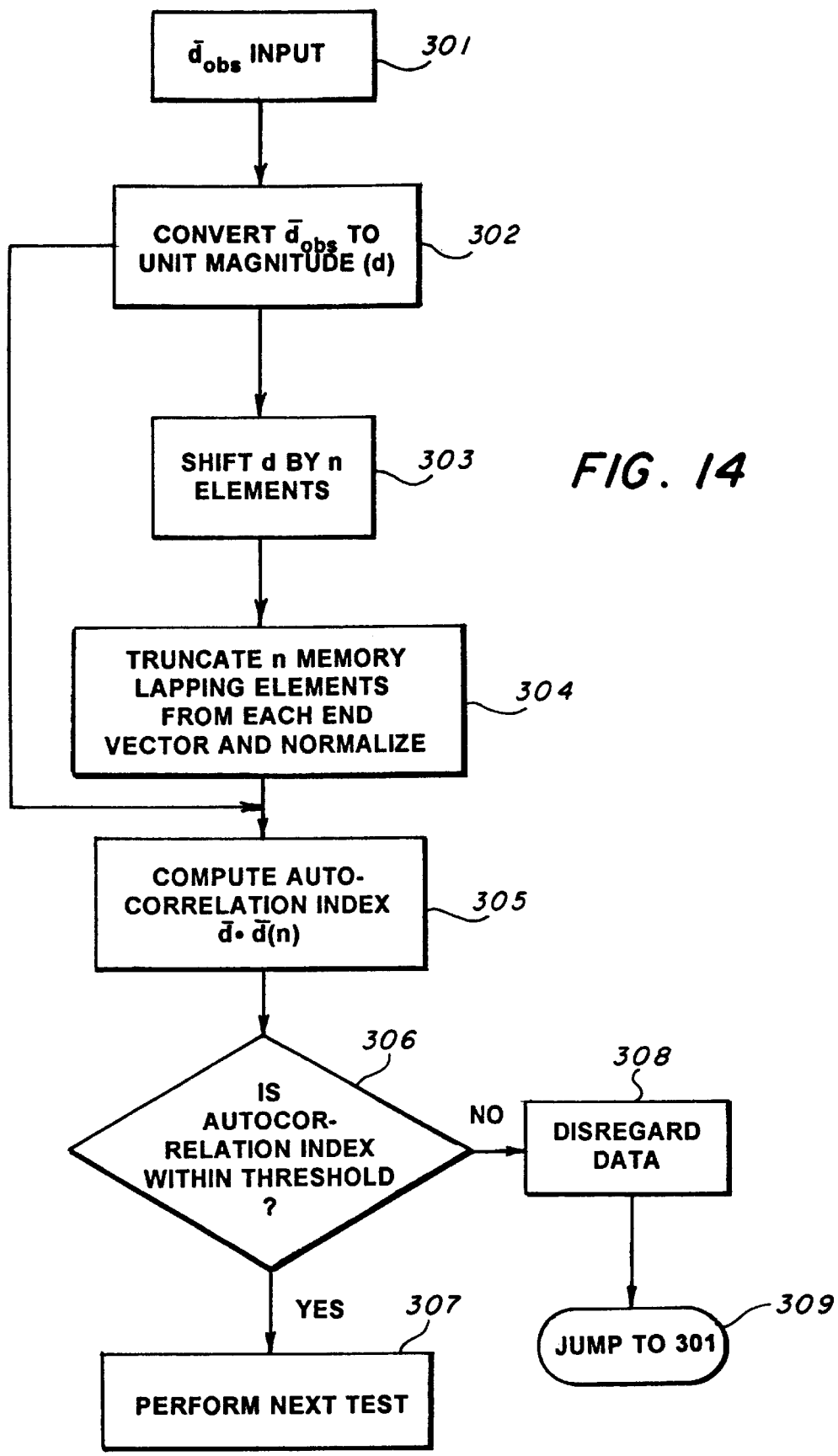
FIG. 14 is a logic flowchart of the operation of the SERENE technique's initial autocorrelation test on a complete data vector.

Referring now to FIG. 14 which shows a flowchart of the operation of the SERENE technique's initial test, first, SERENE samples the new data vector d and performs an autocorrelation test 300 on the data vector d.

In autocorrelation test 300, SERENE introduces an n element shift into the data vector d 303, which will be represented by the notation d(n). The appropriate number of elements, n, are then truncated from the beginning of the original vector and the end of the shifted vector 304, and both vectors are normalized to unit magnitude 302. Next, SERENE computes the autocorrelation index 505, which is a dot product of normalized data vector d in its truncated form with the normalized truncated shifted data vector d(n) which we represent by the notation d•d(n). SERENE then determines whether the autocorrelation index is above the selected threshold value 306. If the autocorrelation index is above the selected threshold, SERENE retains the data vector for the next test 307. If the autocorrelation index is below the selected threshold, SERENE characterizes the data vector d as containing predominately noise, disregards 308 it and selects the next data vector $d_{i+1}$, where i is the with data vector, for testing 301.

The SERENE technique makes a fundamental assumption that useful information contained in a data vector is more correlated than the noise contained in the same data vector. In operation, when the autocorrelation test is performed on a data vector the autocorrelation index will approach zero as the amount of noise in the signal increases. The threshold value which lies between, 1 the maximum value for the autocorrelation index for 'white' spectral signal with zero noise and 0, the minimum expectation value for a signal containing 100% noise, is selected as a function of the mission requirements and the available knowledge of the statistics of the spectral data signals and the noise, representing the minimal S/N requirements for a data vector to be considered useful by the IHPS system.

Thus, the autocorrelation test of the complete data vector d, provides a very fast and efficient way to determine whether the data vector sampled contains a large enough information signal to be considered useful to the system. SERENE simply chooses a threshold which will allows signals which are too noisy for processing to be eliminated with a minimum time expenditure of processor resources.

In yet another embodiment SERENE can operate using traditional autocorrelation techniques. In this embodiment of SERENE several different element shifts are performed and an autocorrelation length is defined as known by those skilled in the art. The autocorrelation length of the data vector is then compared to that typical of clean vectors.

If the S/N is high enough for data vector d to survive the first test (the signal is not predominately noise), SERENE next performs a Scaled $\epsilon$ comparison on the data vector d. In the scaled $\epsilon$ comparison, SERENE compares data vector d with an exemplar $S_j$ where j is simply the jth exemplar. If data vector d falls within the range of an exemplar plus, a noise value chosen on the basis of system noise generated from statistical or test data, the data vector is considered to be equivalent to exemplar $S_j$ and discarded.

Figure 15:
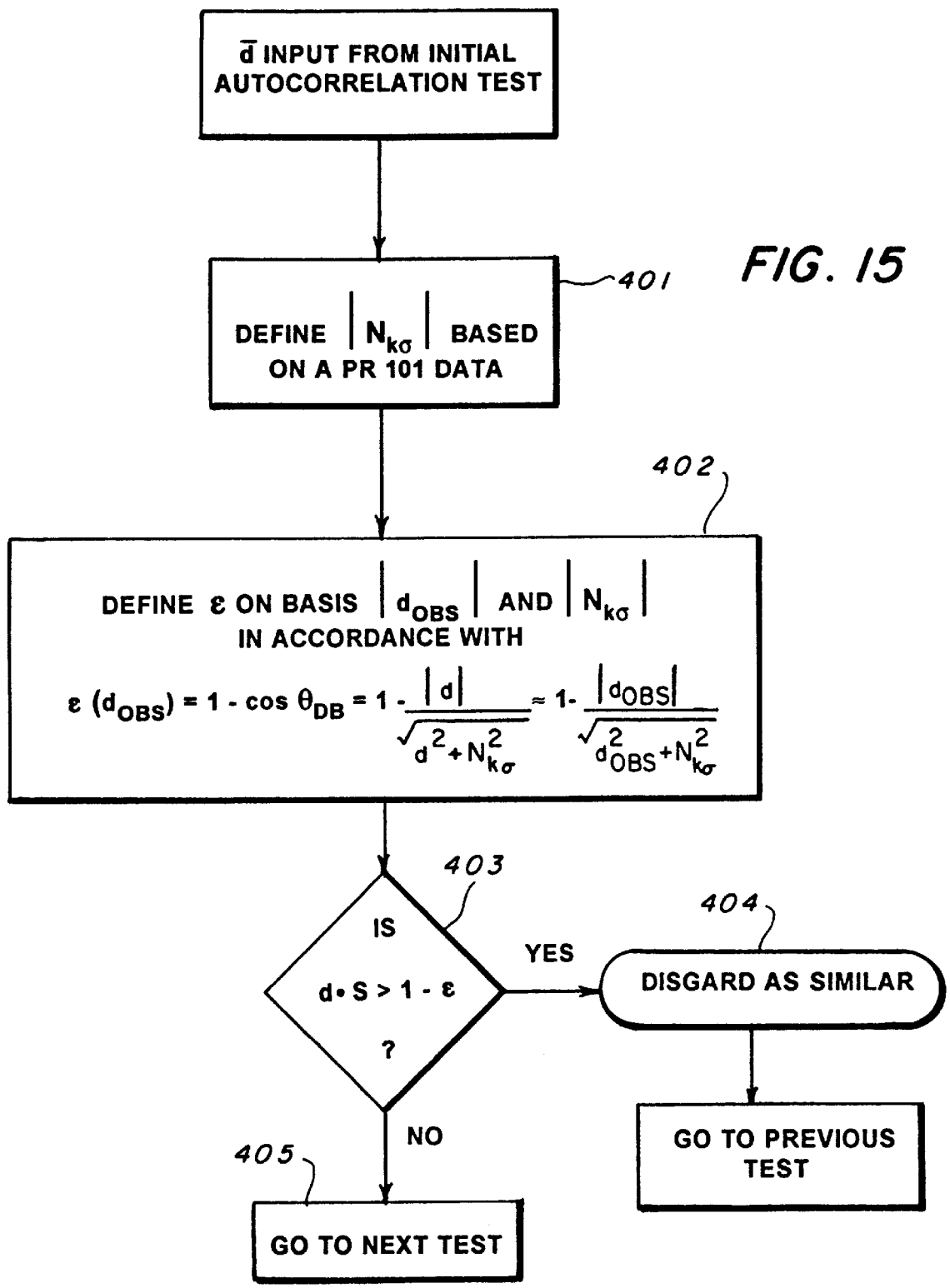
FIG. 15 is a logic flowchart an embodiment of the SERENE technique's scaled $\epsilon$ test.

Referring now to FIG. 15 which shows a flowchart that is an embodiment of the SERENE technique's scaled $\epsilon$ test, SERENE first receives a data vector which has passed the initial autocorrelation test discussed above. In the scaled $\epsilon$ embodiment, SERENE compares data vector d with an exemplar $S_j$ using a value for $\epsilon$ set in relation to noise.

SERENE chooses a threshold magnitude for the noise $|N_{k\sigma}|$ 401, based on the system noise generated from statistical or test data, where k is the scaling factor and $\sigma$ is the standard deviation for noise magnitudes. The selected value of $|N_{k\sigma}|$ defines the decision boundary for the scaled $\epsilon$ test. Next, SERENE computes $\epsilon$ 413 in accordance with the following equation:

$$\varepsilon(d_{obs}) = 1 - \cos\theta_{DB} = 1 - \frac{|d_{clean}|}{\sqrt{d_{clean}^2 + N_{k\sigma}^2}} \approx 1 - \frac{|d_{obs}|}{\sqrt{d_{obs}^2 + N_{k\sigma}^2}} \quad (3)$$

where $d_{obs}$ is the data vector observed (before normalization), $d_{clean}$ is a noise free spectral signal consistent with $d_{obs}$ ($d_{clean}=d_{obs}-$noise), and $\theta_{DB}$ is the angle between $d_{clean}$ and $d_{obs}$, assuming an uncorrelated noise vector with magnitude $|N_{k\sigma}|$ SERENE then applies the standard prescreener test using the value for $\epsilon$ computed in the previous step, and determines whether the difference between d (normalized data vector) and the normalized exemplar $S_j$ currently being considered can be explained by a noise vector with magnitude $|N_{k\sigma}|$ or smaller (d•$S_j$>1-$\epsilon$, which implies that the angle between the vectors is less than or equal to $\theta_{DB}$) 414. If data vector d falls within this range then SERENE concludes that d is similar to $S_j$ and disregards it. If d is beyond the defined range the data vector d is compared with the next exemplar $S_j$, or added to exemplar set 55 if all viable exemplar have been tested.

Since the noise magnitude $|N_{k\sigma}|$ is preferably chosen on the basis of noise generated from statistical or test data, the scaled $\epsilon$ comparison is most effective for filtering intrinsic noise, where some statistical basis or knowledge of the noise is available. In a high quality sensor, the magnitude of the intrinsic noise contribution will be small compared to the magnitude of a typical data vector. Some sensor data vectors d may have exceptionally small magnitude, as in the case of a hyperspectral imager looking at a dark object. In this case the intrinsic noise produces a large change in the direction of a vector, which could confuse the learning process. We refer to this phenomenon as the "dark pixel" effect.

Figure 16:
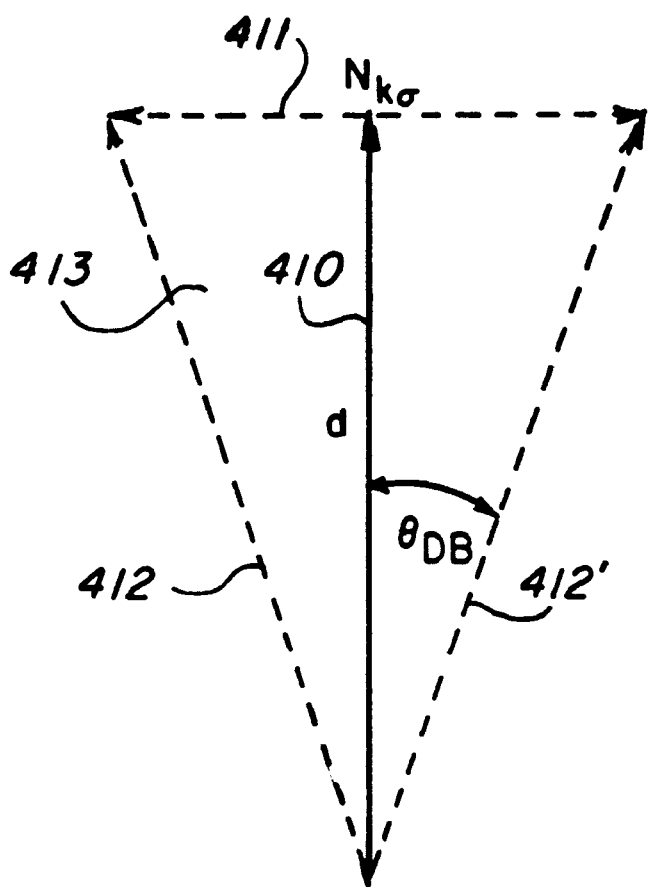
FIGS. 16 and 17 are representations of the $n\sigma$ noise cone decision boundary for the scaled $\epsilon$ comparison illustrating the "dark pixel" effect.
Figure 17:
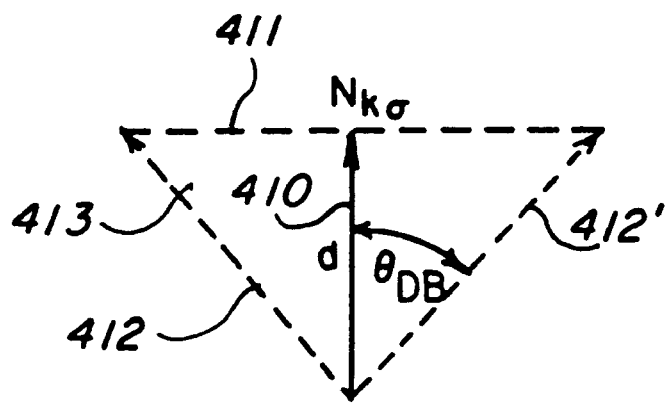

The 'scaled $\epsilon$' comparison between signal vector d and an exemplar $S_j$ reduce the consequence of the "dark pixel" effect. Referring also to FIGS. 16 and 17, which illustrate the basic concept, FIG. 16 shows unnormalized data vector d, as a solid line 410, and a pair of $\underline{N}_{k\sigma}$ noise vectors as dashed lines 411, 411'. The value for k is chosen to establish a decision threshold. $\underline{N}_{k\sigma}$ is likely to be orthogonal to $\underline{d}$, as illustrated. This is the worst case as far as change is direction is concerned and also the most probable case in a high dimensional space. The dotted vectors 412 lie on the boundary of cone 413 such that any vector within cone 413 can be considered the same as $\underline{S}_j$, because the difference is within the range associated with noise. If the vector can be considered the same as exemplar $S_j$ then the vector is discarded as similar or repetitive. A vector lying outside cone 413 is assumed to be different. If the vector lies outside cone 413, data vector d is retained for the next test. The angle $\theta_{DB}$ defines the decision boundary, and $\epsilon=1-\cos\theta_{DB}$. $\theta_{DB}$ depends on the magnitude of $d_{obs}$ i.e., d before normalization, as is easily seen by comparing FIGS. 16 and 17. The value of $\epsilon$ becomes a function of $|d|$, i.e., $\epsilon$ is scaled by $|d|$ in accordance with the relationship disclosed in equation (3).

Noise effect, however is not limited to dark pixels. External noise may affect any data vector in an unpredictable way. SERENE integrates an additional set of techniques into the prescreener module, 50 for reducing the impact of noise carried by data vectors of arbitrary magnitude, without prior knowledge of an expected noise magnitude.

Figure 18:
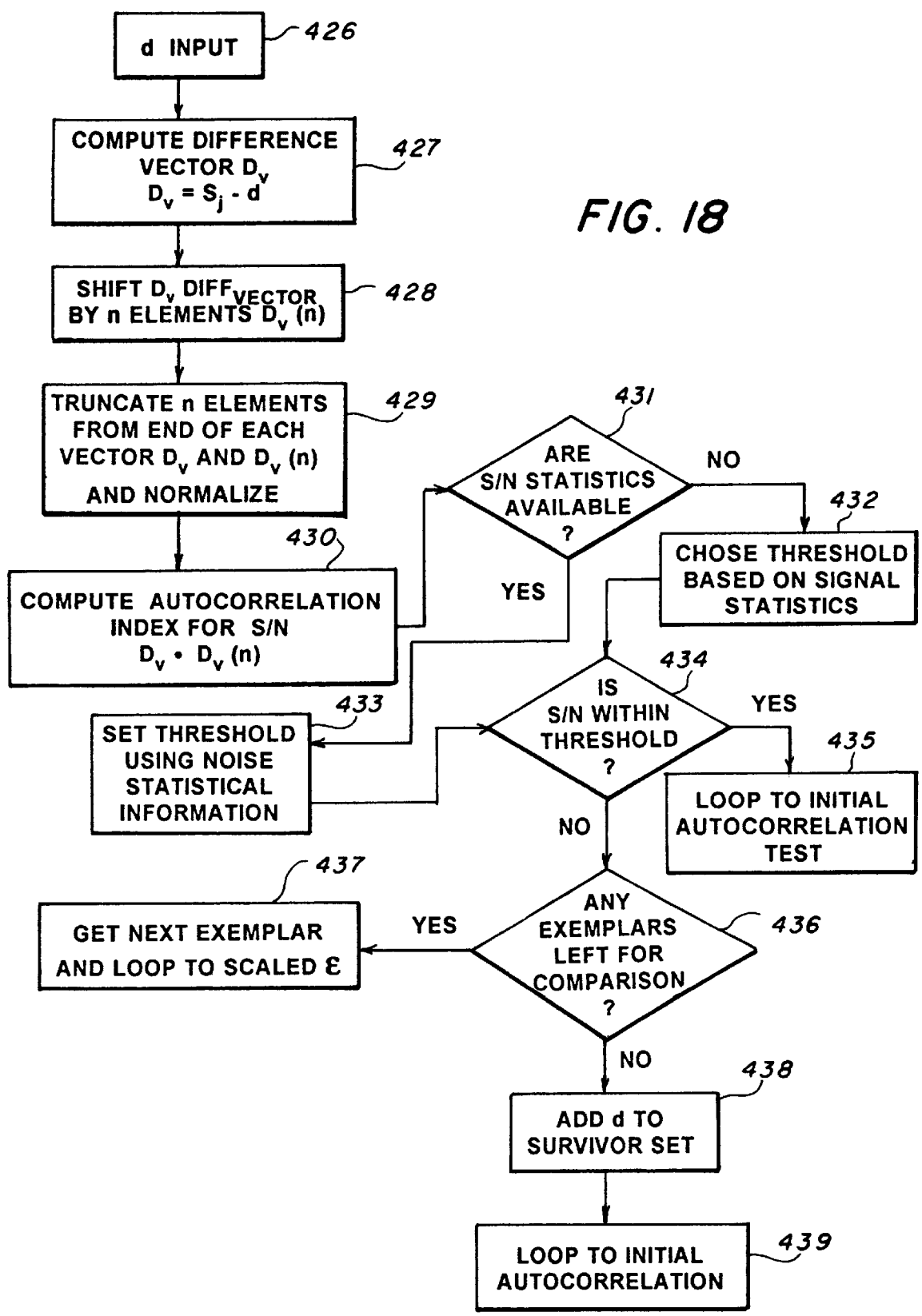
FIG. 18 is a logic flowchart of the SERENE S/N autocorrelation test in the prescreener module.

Referring to FIG. 18, an embodiment of SERENE applies S/N estimation methods to further filter noise in data vectors that have passed the initial autocorrelation and the scaled e test 426. If a vector is not determined to be equivalent to a candidate exemplar by the scaled $\epsilon$ test, an autocorrelation test is performed on the difference between that vector and the exemplars.

SERENE first computes the difference vector $D_v$ which is the difference between the normalized data vector and the exemplar or $(S_j-d)$ 427. When the autocorrelation test is employed in the Gram-Schmidt process, as discussed latter, the difference vector is generated using the difference between the full exemplar and its projection into the current space, called the residual. Once the difference vector $D_v$ is defined, SERENE generates a shifted version of the difference vector, $D_v$ 428 defined as $D_v(n)$ where n is the number of elements $D_v$ is shifted by. Next, n elements are truncated from $D_v$ and $D_v(n)$ and both vectors are normalized 429. The autocorrelation index is then computed for the difference vector $D_v$ 430 by taking a dot product of $D_v$ against a shifted version of itself $D_v(n)$, which can be expressed as $D_v \cdot D_v(n)$.

If the difference vector's autocorrelation index falls within the noise parameters, or threshold, i.e., if the difference can be explained by noise, SERENE concludes that there is a 'match' 434 the data vector d is discarded and SERENE gets the next data vector $d_n$ reinitiating the test regime 435, beginning with the initial autocorrelation test described in FIG. 14. If the autocorrelation index is beyond the threshold, vector d is compared to other exemplars 436, 437, until a match is found or the vector is added to the exemplar set S 438. When a data vector d is added to the exemplar set SERENE gets the next vector and reinitiates the test regime 439, beginning with the initial autocorrelation test described in FIG. 14.

The decision boundary or threshold SERENE uses in the above autocorrelation test to determine whether there exist conditions which warrant further testing of the data vector d 434, may be set on the basis of the statistics of the noise 433 or by defining the threshold based on the statistics of the signal if the noise statistics are unavailable 432.

Figure 19:
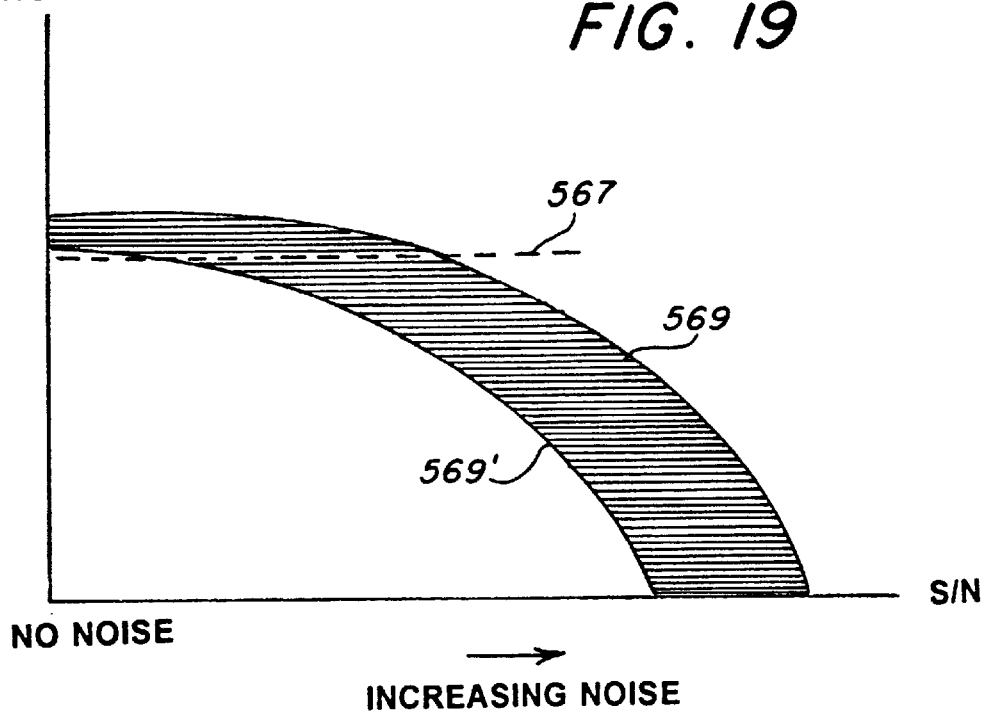
FIG. 19 is a representations of a decision boundaries for the Autocorrelation test based on statistical data on noise.

Autocorrelation indices provides an measure of how much noise is mixed with a given data vector. Referring now to FIG. 19 which shows a statistical noise data, if the autocorrelation characteristics of the signal (spectra), sought are known, a threshold value (decision boundary) can be defined as illustrated by dashed line 568.

If one knows the statistics of noise which one will ordinarily encounter, one can predict the relationship between the signal to noise ratio (S/N) of a data vector, e.g. $D_v$, and its autocorrelation length. FIG. 19 shows such a relationship. For plural vectors having identical hS/N, their respective autocorrelations will vary statistically about a mean value. Curves 569 and 569 are selected to encompass between them a preselected variation in autocorrelation index, within which the system will deem associated with a specific value of S/N. This variation could be, e.g., a preselected number of standard deviations about the mean value of autocorrelation length which one would expect at the given S/N. Selection of this variation is mission dependent, with a large width resulting in a larger number of noisy data vectors missed by the system. Discriminate line 567 is arbitrarily set so that all data having autocorrelatin lengths 567 (and correspondingly small S/N) are retained; those below are rejected. Line 567 is preferably set to intersect the "autocorrelation length" axis of FIG. 19 just below line 569 so that all clean data which autocorrelates within one's preselected statistical range will not be rejected. Although one could use this test on any data vector, it is preferred to use $D_v$, because it results from a subtraction of vectors. Because information is less random than noise, subtraction tends to remove information and leave noise, making it easier to identify and quantify the noise. This is especially important for dark pixels, in which the noise itself may be of the same order of magnitude as the signal.

Figure 20:
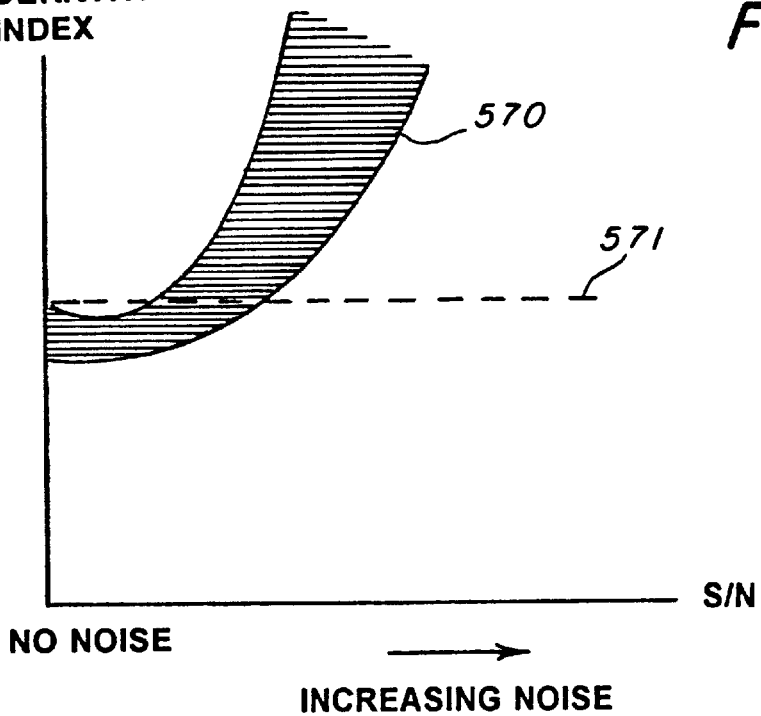
FIG. 20 is a representations of a decision boundaries for the Derivative test based on statistical data on noise.

Another embodiment of SERENE uses a derivative test in place of the autocorrelation test as a measurement of the noisiness of a signal. These are basically higher order finite differences constructed by shifting the vector elements. If d(n) represents the data vector with its elements shifted to the right by n places, then the $n^{th}$ autocorrelation index is d•d(n), and the second derivative index is $(d^{(-1)}-2d+d^{(+1)})^2$. As illustrated in FIG. 20, derivative indices tend to be more sensitive to the presence of noise as indicated by the shaded area 570, which represents the range of expected derivative values for a given S/N ratio due to the randomness of the noise and the diversity of signals area quickly crossing the decision boundary 571 or threshold, providing more accurate estimates of S/N. SERENE applies these methods for estimating S/N directly from the data to the problem of reducing the effects of noise on the IHPS learning process.

Yet another embodiment the SERENE technique may also use a 'nonlinear scaled $\epsilon$' comparison in Prescreener Module 50 in place of the 'scaled $\epsilon$' comparison. The magnitude of the signal vector is in general less than the magnitude of the observed vector, which is the signal plus noise. Statistically, the most likely relationship is $d^2_{obs} \approx d^2+N^2$. Therefore the best value for $\epsilon$ is likely to be larger than the value computed above, for small magnitude data vectors. To correct for this, SERENE computes $\epsilon$ from a formula of the form $$\epsilon_{n1}(d_{obs})=f(\epsilon(d_{obs}))$$

where $f$ is a function such that $f(\epsilon(d_{obs})) \sim \epsilon(d_{obs})$ for large magnitude data vectors, and $f(\epsilon(d_{obs})) > \epsilon(d_{obs})$ for small vectors. This biases the exemplar selection process against small vectors, which are most likely to be seriously corrupted by noise. The optimal functional form for the function f can be inferred from the noise statistics, if they are known, or constructed in an empirical way well known to those skilled in the art.

Again referring to FIG. 1, the exemplar set data, as computed by prescreener 50 is input 58 into adaptive learning module so. Learning module 30, computes from the exemplar set, a set of endmembers $\{E_j\}$, where j is the jth endmember, which together span the current scene. Endmembers are a set of fundamental patterns (vectors) from which any pattern vector in the data set can be reconstructed as a convex combination in reduced dimensional space, to within an error determined by the noise or other error criteria. The requirement that all of the observed spectral vectors $d_k$ be representable as convex combinations of conventional basis vectors, insures that the decomposition makes sense as a physical mixture of constituents, since any such mixture must have this property. The resulting patterns conform as closely as possible to signatures of actual constituents of the scene.

Figure 8:
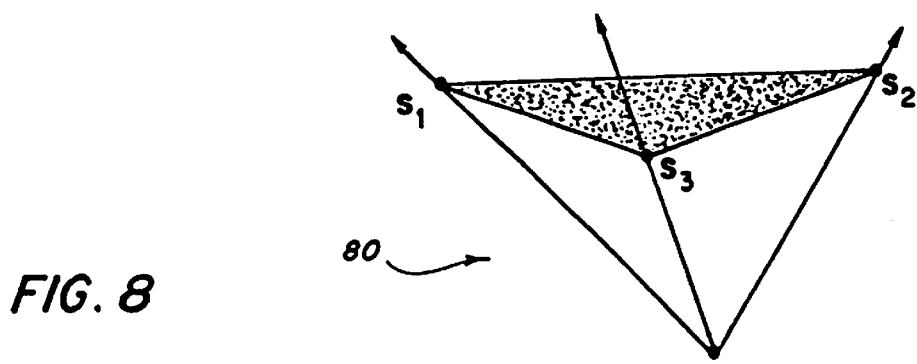
FIG. 8 is a representation of the 3-dimensional spanning space showing the salient vectors.
Figure 12:
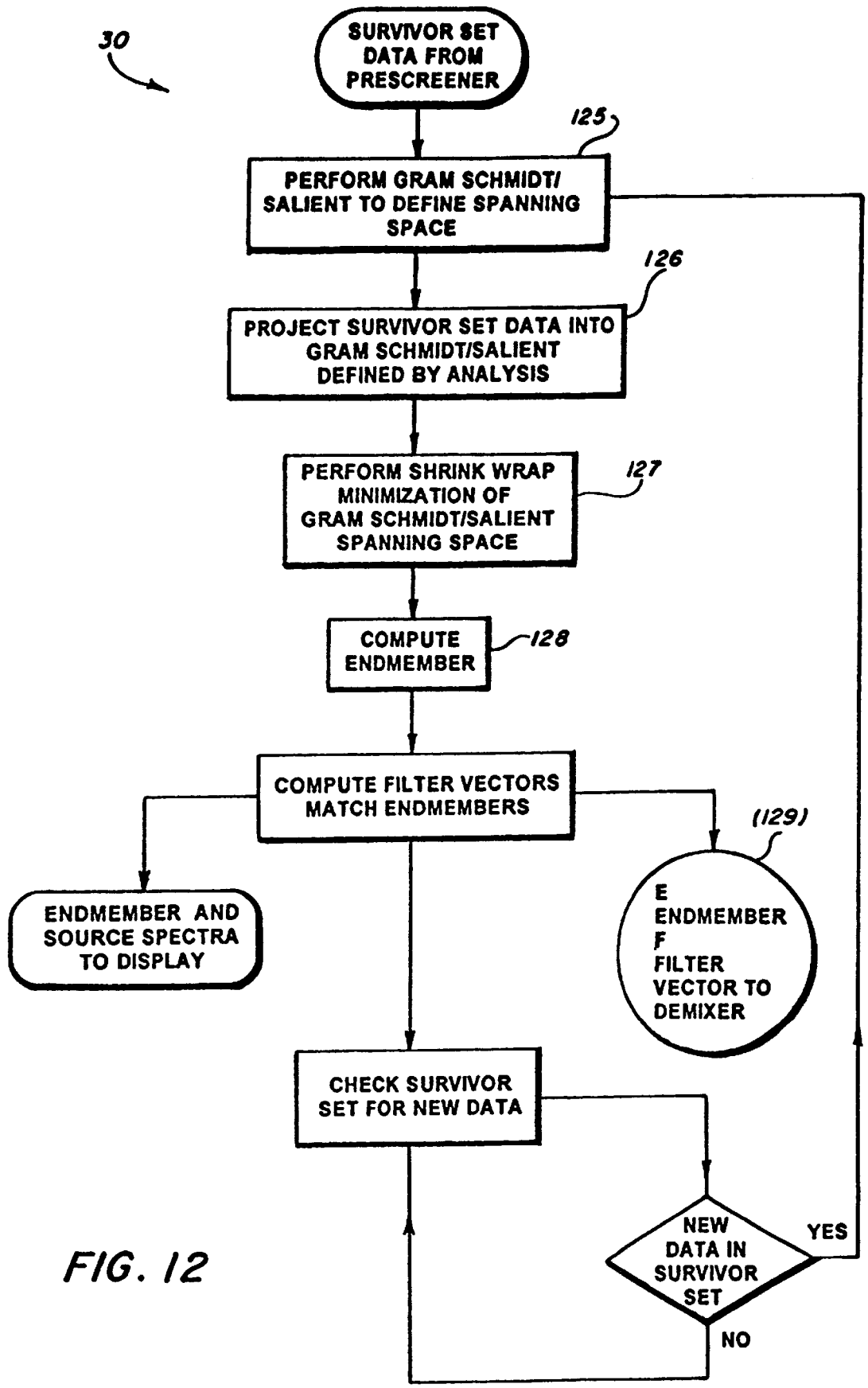
FIG. 12 is a logic flowchart of the operation of the adaptive learning module.

Referring now to FIG. 12, learning module 30, employs an ordered Gram-Schmidt analysis using salients to construct a reduced dimensional spanning space 125, while retaining the spectral information contained in the exemplar set. The spanning space is constructed based on a spectral uniqueness hierarchy. The observed spectra of the exemplar set, expressed as vector data are then projected into the spanning space 126. Computation of the endmembers is performed by Learning module 30 by projecting the exemplar set data into a reduced dimensional spanning space using a Gram-Schmidt/Salient analysis of the exemplar set data, and employing Shrink Wrap minimization 127 to minimze the spanning space volume defined using Gram-Schmidt/Salient analysis. The endmembers are defined 128 by the vertices of the hyper triangle defined by the minimized spanning space as illustrated in FIG. 8.

Gram-Scmidt/Salient Analysis

The spanning space is defined by using a Gram-Schmidt/Salient analysis of the exemplar set. In the parameter vector space which contains the exemplar set data, one first determines the two vectors which are furthest apart in the space, then, in the plane formed by these two vectors, select two mutually orthogonal vectors which lie in the plane. These mutually orthogonal vectors are for convenience called basis vectors, for reasons made apparent below. Then select the vector in the data cube which is furthest from the plane and identify the hyperplane in which the basis vectors, and the newly selected vector, lie, and select a third basis vector such that it lies in the hyperplane and is mutually orthogonal to the other two basis vectors. One repeats this process, and accumulates more and more mutually orthogonal basis vectors, until the most distant remaining vector is found to be within a preselected distance of the hyperplane containing all the basis vectors. At this point, the exemplar set vectors are projected onto the reduced dimensional space defined by these basis vectors, and further processing is done thereon. By reducing the dimension of the vector space in which one must work, one correspondingly reduces the number of operations one must do to perform any calculation. Because none of the data vectors lie very far outside the hypervolume spanned by the basis vectors, projecting the vectors into this subspace will change their magnitude or direction very little, i.e. projection merely sheds components of each vector which were small already. Furthermore, because such components are necessarily too small to correspond to significant image features, these components are disproportionately likely to be noise, and discarding them will increase the system's signal to noise ratio.

Figure 4:
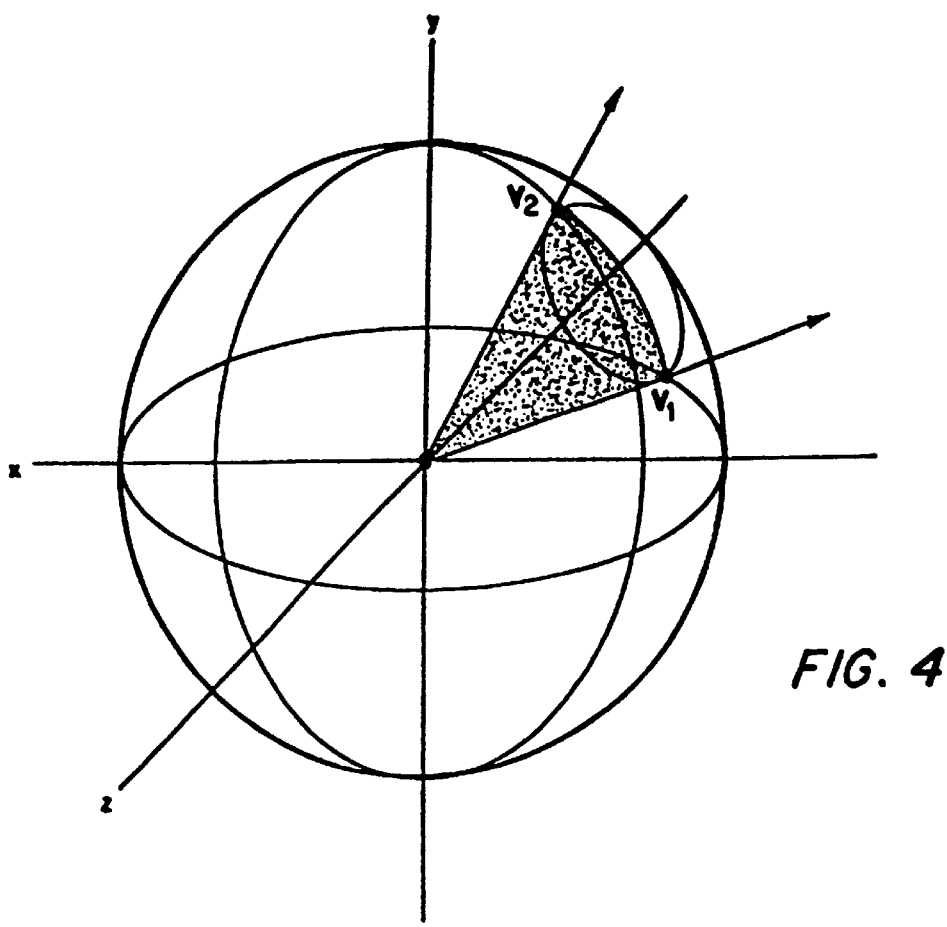
FIG. 4 is a representation of the plane created by $V_1$ and $V_2$ during Gram-Schmidt operations.
Figure 6:
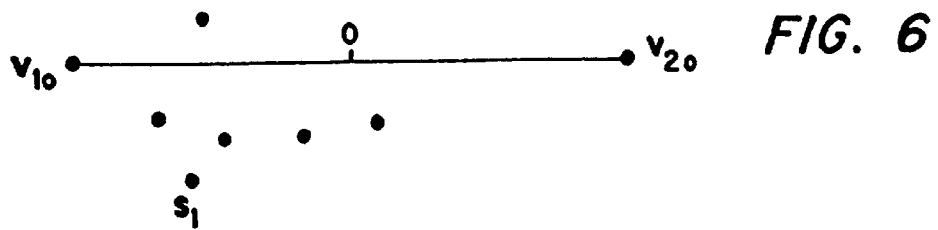
FIG. 6 is a representation of the Salient vector and plane defined by $V_{10}$ and $V_{20}$.
Figure 7:
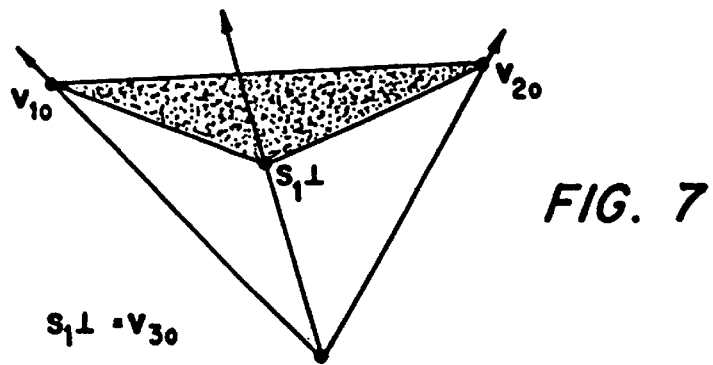
FIG. 7 is a representation of the 3-dimensional spanning space defined during Gram-Schmidt/Salient operations.

Gram-Schmidt\Salient analysis of the exemplar set data is performed in accordance with the following algorithm:

a) Designate the two exemplars farthest apart, $V_1$ and $V_2$. FIG. 4 illustrates the orientation of $V_1$ and $V_2$ and the plane that $V_1$ and $V_2$ define.

b) Generate a 2 dimensional orthogonal set of basis vectors from $V_1$ and $V_2$ labeled $V_{1o}$ and $V_{2o}$ in the plane defined by $V_1$ and $V_2$, labeled as $PV_{o12}$ as illustrated in FIG. 5.

c) Determine the salient vector (vector displaced farthest from plane) in relation to plane $PV_{o12}$, defined in FIG. 6 as $S_1$.

d) The salient $S_1$ can be represented as a sum of vectors $S_1\perp$ and $S_1\|$, where $S_1\perp$ is orthogonal to the plane $PV_{o12}$ and $S_1\|$ lies in the plane. Use the Gram-Schmidt procedure to find $S_1\perp$, and call this $V_{3o}$. $V_{1o}$, $V_{2o}$ and $V_{3o}$ now define a subspace in 3 dimensions. See the FIG. 7. representation of the subspace created by this step.

e) Select the salient $S_2$ which is the exemplar farthest from the subspace defined by step (d).

f) Generate a new orthogonal direction from $S_2$ defined as $V_{4o}$. $V_{4o}$ coupled with $V_{1o}$, $V_{2o}$, and $V_{3o}$ now defines a subspace of 4 dimensions.

g) Steps (e) and (f) are repeated to define a spanning space of N dimensions. The distance out of the current subspace of the salient selected at each step is the maximum residual error which would be incurred by projecting all of the exemplars into the subspace. This decreases at each stage, until the remaining error is within a specified error tolerance. At this point the subspace construction process is complete. The value of N is the number of dimensions necessary to allow the projection of the exemplars into the subspace while at the same time preserving important but infrequent signatures.

h) Project all of the exemplar data into the spanning space defined in steps (a)–(g).

Figure 21:
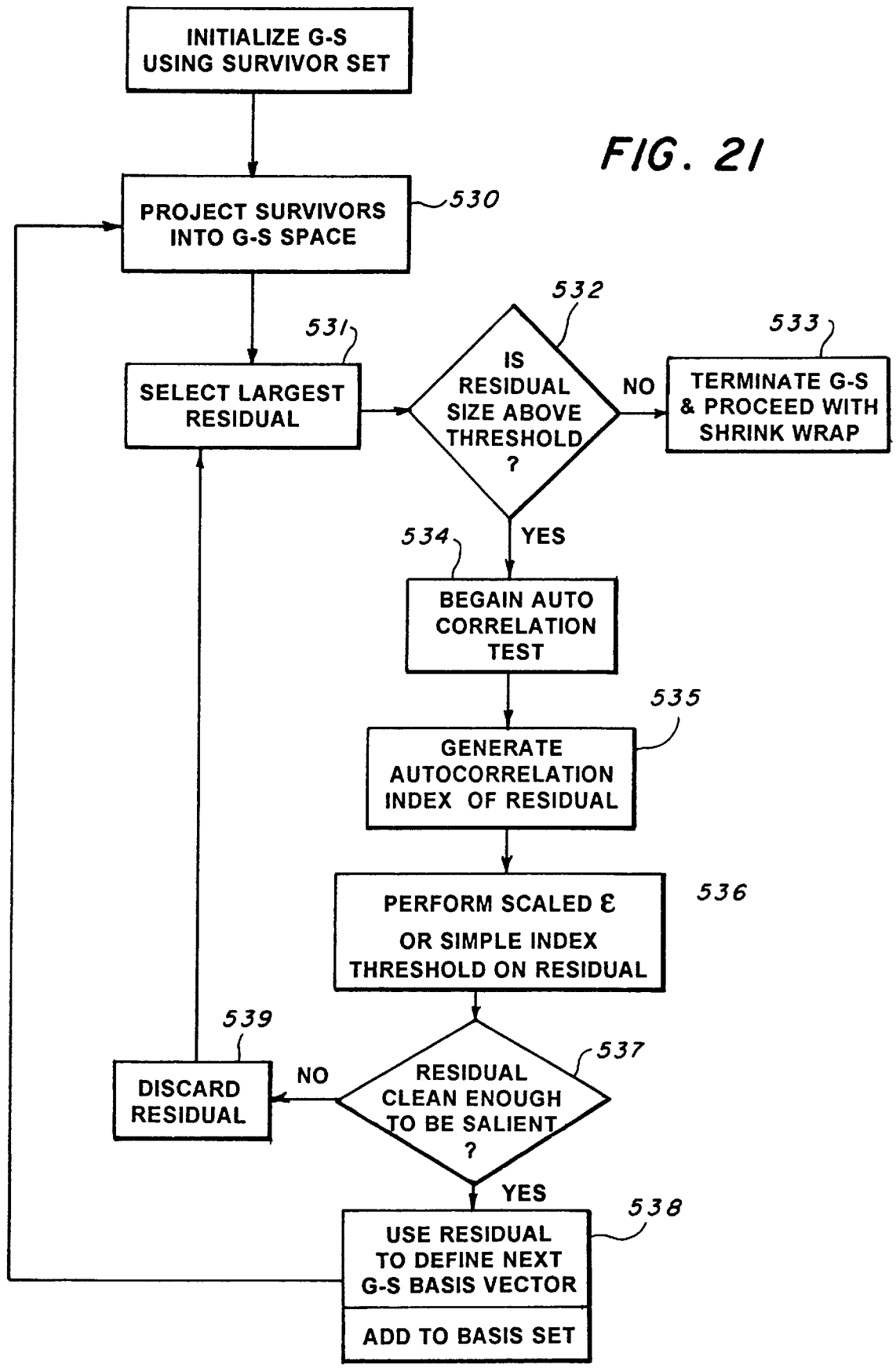
FIG. 21 is a logic flowchart of the SERENE technique's autocorrelation test integrated into the Gram-Schmidt process.

In another embodiment, SERENE is integrated into the Gramchmidt/Salient technique. Referring now to FIG. 21, when SERENE is incorporated into the Gram-Schmidt process, each time an exemplar is projected into the spanning space defined by Gram-Schmidt 530 SERENE selects the largest residual as a candidate salient 531. Next, SERENE determines whether the residual is above the threshold 532, the selection of which is mission dependent. If the residual is below the threshold, SERENE concludes that a sufficient amount of data has been projected into the spanning space and the Shrink Wrap process is initiated 533. If the candidate residual is above the threshold, an autocorrelation test is then performed on the residual comparing the full data vector to its Gram-Schmidt projection 534. The residual is the difference between the data vector and its projection, and the objective of the test is to determine if the difference is the result of noise alone, or is indicative of information not yet captured by the Gram-Schmidt space. The autocorrelation test implemented in the Gram-Schmidt process follows the algorithm of the autocorrelation test defined above and illustrated in FIG. 18.

Referring to FIG. 21 an autocorrelation index is computed using the residual 535. The autocorrelation index of the residual is then used to determine if the residual is clean (noise free) enough to be a salient 537. If sufficient knowledge of the noise statistics is available, the index is used to estimate the noise magnitude, which in turn is used to construct the cone in the scaled $\epsilon$ test 536, otherwise the index value is compared to a predetermined threshold, as described above. If the residual is determined to be noise dominated 537, the residual is discarded 539 and another (the next largest) is chosen 531. If the residual is determined to be sufficiently clean 537, the residual is used to define the next Gram-Schmidt basis vector and added to the Gram-Schmidt basis set 538.

Thus SERENE is able to continually filter noise and further reduce the affects of intrinsic and extrinsic noise while maintaining the resolution and efficiency of the system In other embodiments, these correlation techniques can also be integrated into the Shrink Wrap process.

Shrink Wrap

Once the N-dimensional spanning space is defined using the Gram-Schmidt\Salient analysis, a convex manifold in the form of a hypertriangle within the spanning space is generated using shrink wrap minimization. Shrink wrap minimization of the spanning space is a simple minimization operation, in which the volume of the manifold is reduced, while maintaining the condition that all of the data vectors projected into the reduced dimensional space via Gram-Schmidt\Salient operations are contained within the hypertriangle. The vertices of the hypertriangle are the endmembers, and the volume defined by the hypertriangle itself is the locus of all possible mixtures (convex combinations) of endmembers. The shrink wrap process determines good approximations of the physical constituents of the scene (endmembers), by insuring that the shape and orientation of the hypertriangle conforms as closely as possible to the actual distribution of the data vectors (exemplars). The exemplars are assumed to be mixtures of the actual constituents. The number of endmembers is equal to the dimension of the Gram-Schmidt/Salient spanning space.

Figure 9:
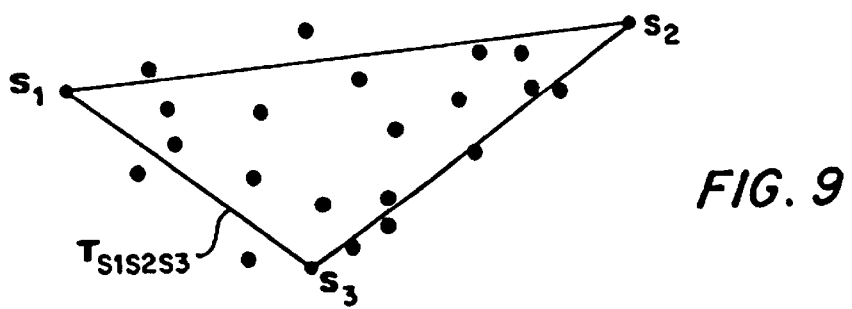
FIG. 9 is a representation of a hypertriangle convex manifold.

The salients are used to guide the shrink wrap process. Referring to FIG. 8, hypertriangle $T_{S_1S_2S_3}$ is defined by salient vectors, however, other vectors which include data may not be within the spanning space which $T_{S_1S_2S_3}$ defines, as depicted in FIG. 9. The shrink wrap operation must satisfy the condition that all of the data vectors projected into the spanning space must be contained within the volume defined by convex manifold $T_{E_1E_2E_3}$. The shrink wrap operation starts with $T_{E_1E_2E_3}=T_{S_1S_2S_3}$ and then expands or contracts the triangle $T_{E_1E_2E_3}$ by manipulating the vertices, $E_1$, $E_2$ and $E_3$ or by manipulating the orientation of planes that define $T_{E_1E_2E_3}$, by the minimal amount to fulfill the above stated condition.

For the foregoing system, one could use advantageously any of the tests described above to filter out noisy data at any point within the system. These tests, however, vary in the amount of computation they require. As a result, the fixed epsilon correlation test is most advantageously used in a preprocessor to provide a coarse and computationally cheap way to remove badly corrupted data at the outset. The scaled epsilon test, or the substration and autocorrelation test (cf. FIG. 19) are most advantageous as a prescreener, immediately prior to testing the data against exemplars. The derivitive test is best used in the Gram-Schmidt processor, to test and weed out spurious endmember candidates. Addition of bogus endmembers will rapidly destroy system effectiveness, so this most precise and computationtally expensive test is best used here.

Just as subtracting data vectors amplifies the effect of noise, so too does taking the derivative of data, provided that noise is changing more rapidly than the data, i.e. that the noise has a higher frequency spectral content. If the data vectors are hyperspectral data, most of the elements of the vectors represent light intensity as a function of frequency bin, i.e. a spectrum If one uses any known numerical method to calculate, element by element, the first or higher derivative of the normalized spectrum as a function of frequency, one produces a resultant vector, each of whose elements corresponds to the first or higher derivative of the spectrum at the respective frequency bins represented by the original data vector. One can then estimate how rapidly the spectrum is changing by calculating the magnitude of the resultant vector, a high magnitude indicating high noise content.

FIG. 20 illustrates this, and is a schematic plot of magnitude, or "derivative index," as a function of S/N. Similar to the data of FIG. 19, the derivative index will statistically vary about some mean value for a given data vector S/N, and thus one preferably selects the degree of variation which one's mission can tolerate, and generates corresponding boundary curves 570.

Discriminate 571 is arbitrarily set to reject as noisy all data having S/N above line 571. This discriminant is preferably chosen to be just above the zero noise values of curves 570 to ensure that all data with zero noise will not be rejected.

As FIG. 20 indicates, curves 570 rise sharply with increasing noise. One need not practice this approach with a first derivative, but may use a derivative of any order, and, in general, the curves rise more sharply and provide better noise discrimination with increasing order derivatives. However, the higher the order of the derivative, the more computations are required.

This method is much faster than conventional forier transforms and other standard methods of determining frequency content, and is therefore better suited for use in high data rate systems.

For purposes of example, the method described above and the following methods have been found effective, however, any minimization method which maintains the condition that all of the data vectors be contained within the minimized space is suitable.

Adaptive learning module 30 generates a set of filter vectors $\{F_i\}$ and endmembers $\{E_1, E_2, E_3 \ldots E_N\}$ in accordance with one or a combination of the following procedures, or variants thereof:

Method 1

Figure 10A:
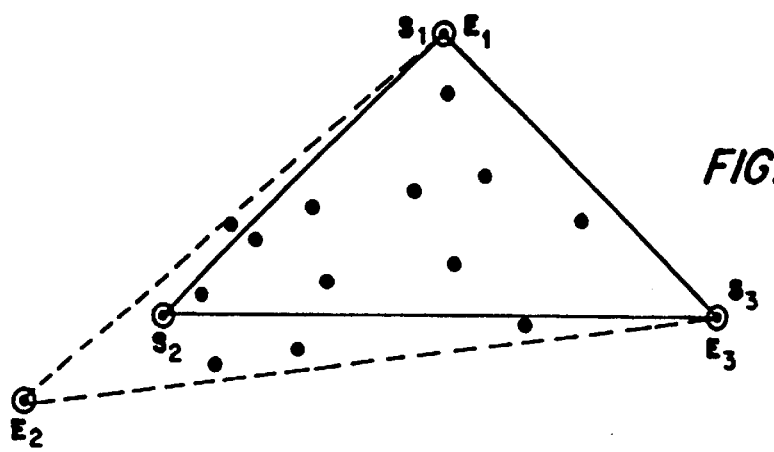
FIG. 10a is a representation of a minimized hypertriangle defined using shrink wrap method 1.

With reference to FIG. 10a, find a set of endmembers $\{E_i\}$ such that each endmember $E_i$ is matched to a salient vector $S_i$, and is as close as possible to its salient, subject to the condition that all the data vectors are inside the hypertriangle with vertices $\{E_i\}$. I.e., minimize $$C = \sum_{i=1}^{N_D} (E_i - S_i)^2$$

subject to the constraints $F_i \cdot d_k \geq 0$ for all i and k and $N_D$ is the number of dimensions. The filter vectors are computed from the candidate endmembers as described above. This constraint condition means that all the coefficients of the decomposition of $d_k$ into endmembers are non-negative, which is equivalent to saying that all $d_k$ are inside $T_{E_1 E_2 \ldots E_N}$. This is a nonlinear constrained optimization problem which can be solved approximately and quickly using various iterative constrained gradient methods.

Method 2

Figure 10B:
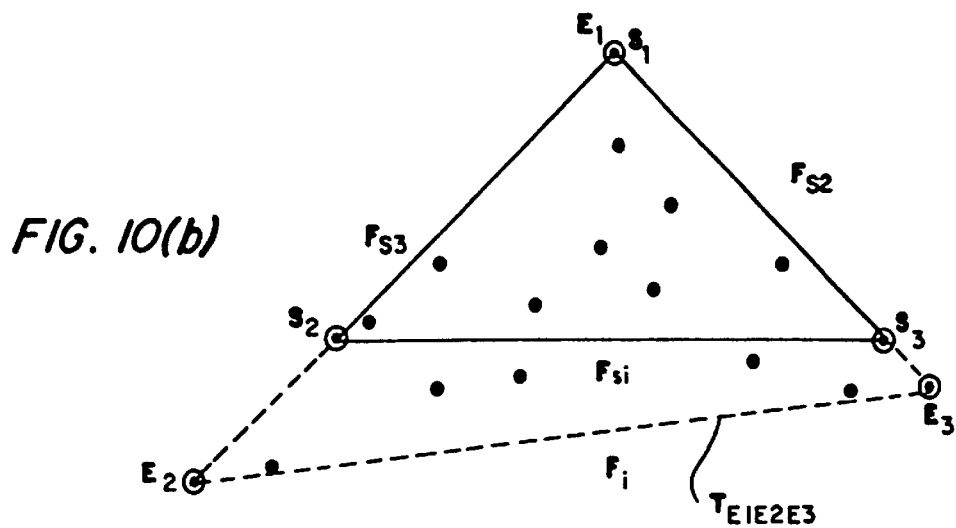
FIG. 10b is a representation of a minimized hypertriangle defined using shrink wrap method 2.

Compute a set of filter vectors $\{F_{si}\}$ from the salients $\{S_i\}$, using the formulas previously provided. These vectors will not, in general satisfy the shrink wrapping constraints see FIG. 10b. Find a new set of Filter vectors $\{F_i\}$ such that each Filter vector $F_i$ is matched to a salient Filter vector $F_{si}$, and is as close as possible to its salient filter, subject to the condition that all the data vectors are inside the hypertriangle. I.e., minimize $$C=(F_i-F_{si})^2$$

subject to the constraints $F_i \cdot d_k \geq 0$ for all k. This is a set of independent quadratic programming problems with linear constraints, which can be solved in parallel using standard methods. The decoupling of the individual filter vector calculations increases computational efficiency. Manipulation of the Filter vectors instead of the endmember vectors is equivalent to manipulating the plane faces of the triangle instead of the vertices. Given solutions for the Filter vectors, find the endmembers using the same procedure used to compute Filter vectors from endmembers (the defining relationships are symmetric except for a normalization constant).

Method 3

Figure 11:
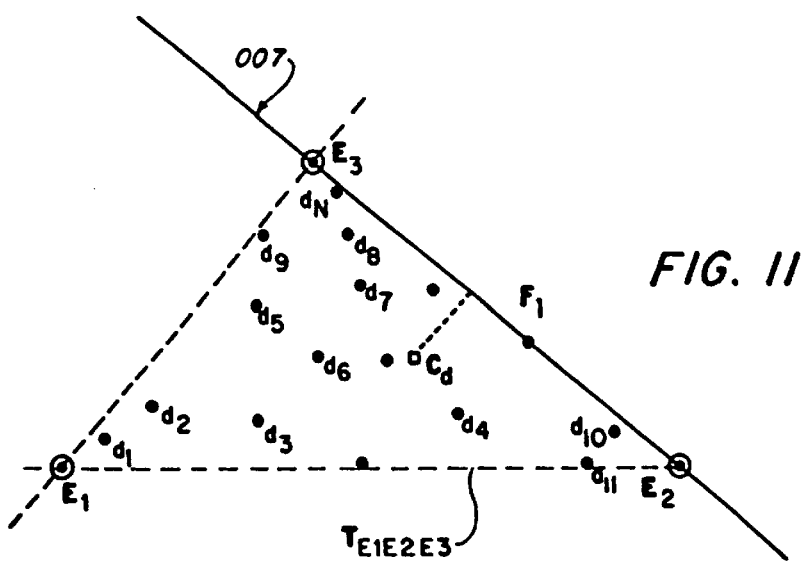
FIG. 11 is a representation of a minimized hypertriangle defined using shrink wrap method 3.

With reference to FIG. 11, find an approximate centroid $C_d$ of the set of exemplars, and then find the hyperplane of dimension one less than the dimension of the Gram-Shmidt/Salient space which is closest to the centroid Hyperplane 120 divides the complete subspace into two halves, and the minimization is subject to the constraint that all the survivor vectors $d_k$ must be in the same half-space as the centroid $\{c_d\}$. The normal to the optimal hyperplane 120, is $F_1$, the first filter vector, and the condition that all the survivors are in the same half-space is equivalent to the constraint that $F_1 \cdot d_k \geq 0$ for all k. This process is equivalent to finding a vector $F_1$ with a fixed magnitude which minimizes the dot product $F_1 \cdot C_d$ subject to the constraint $F_1 \cdot d_k \geq 0$ for all k. As such it is amenable to solution using conventional constrained optimization methods. The hypertriangle $T_{E_1 E_2 E_3}$ can be constructed out of a set of suitably chosen optimal (locally minimal distance to the centroid) bounding hyperplanes which form the faces of the convex manifold. The normal to each face defines the associated filter vector. Again, the endmembers can be determined from the Filter vectors at the end of the shrink wrapping process.

Referring to FIG. 12, once the endmembers and filter vectors are computed adaptive learning module so stores this endmember and filter vector data, along with data reflecting the exemplar set, and source vectors 33 for future recall. The adaptive learning module 30 then searches the exemplar set for any changes. If the system detects change in the exemplar set 99, the Gram-Schmidt and shrink wrap processes are repeated. This process allows the system to continually learn and adapt to changes in the environment. Endmember data and the accompanying exemplar set and source data can be labeled as being consistent with a particular threat or target allowing the system to learn and remember the signature of specific targets in real time 34.

Similarly, the IHPS Shrink Wrap procedure involves an iterative movement of candidate endmember vectors, subject to the condition that all the exemplars end up inside the hypertriangle defined by the endmembers. Small excursions of exemplar vectors outside the hypertriangle can be ignored if the difference between the actual exemplar and its projection on the hypertriangle can be attributed to noise.

In the real time mode, preprocessor, prescreener and the Gram-Schmidt/shrink wrap routines all run simultaneously in parallel.

Again, referring to FIG. 1, the filter vectors and endmember data stream are transmitted from learning module 30, to demixer module 40, for computation of the endmember coefficients. The original data set from the sensor is also transmitted to demixer module 20 through the first processor pipe.

Demixer module 20 may contain several processors, each of which convolves the unprocessed data vector with a different filter vector. These operations could be performed sequentially on a single fast processor, but in the best mode they are performed in parallel. The output of demixer module 20, is a vector called the endmember coefficient vector, the jth element of which indicates the fraction of the jth fundamental pattern which is present in the unprocessed data vector. The endmember coefficients indicate the amplitude of the signal from the associated endmember, in a mixed spectrum.

Demixer module 20 convolves the unprocessed data vector and computes the endmember coefficient in accordance with the equation;

$$F_J \cdot d_k = \sum_{j=1}^{n} c_{jk} F_J \cdot E_j + F_J \cdot N_k \approx c_{Jk}$$

where $F_j$=said filter vector, $d_k$=said data set, $c_{jk}$=said endmember coefficient, $N_k$=noise vector and $E_j$=said endmember.

Dernixer module 20 next computes the fraction coefficient 131, which tells what percentage of the photons from the given pixel are associated with the endmember in accordance to the equation:

$$c_{jk\ fraction} = \frac{c_{jk} A(E)_j}{A(d_k)}$$

where $A(d_k)$ is the area under vector $d_k$, i.e. the sum of the elements of $d_k$.

Figure 13:
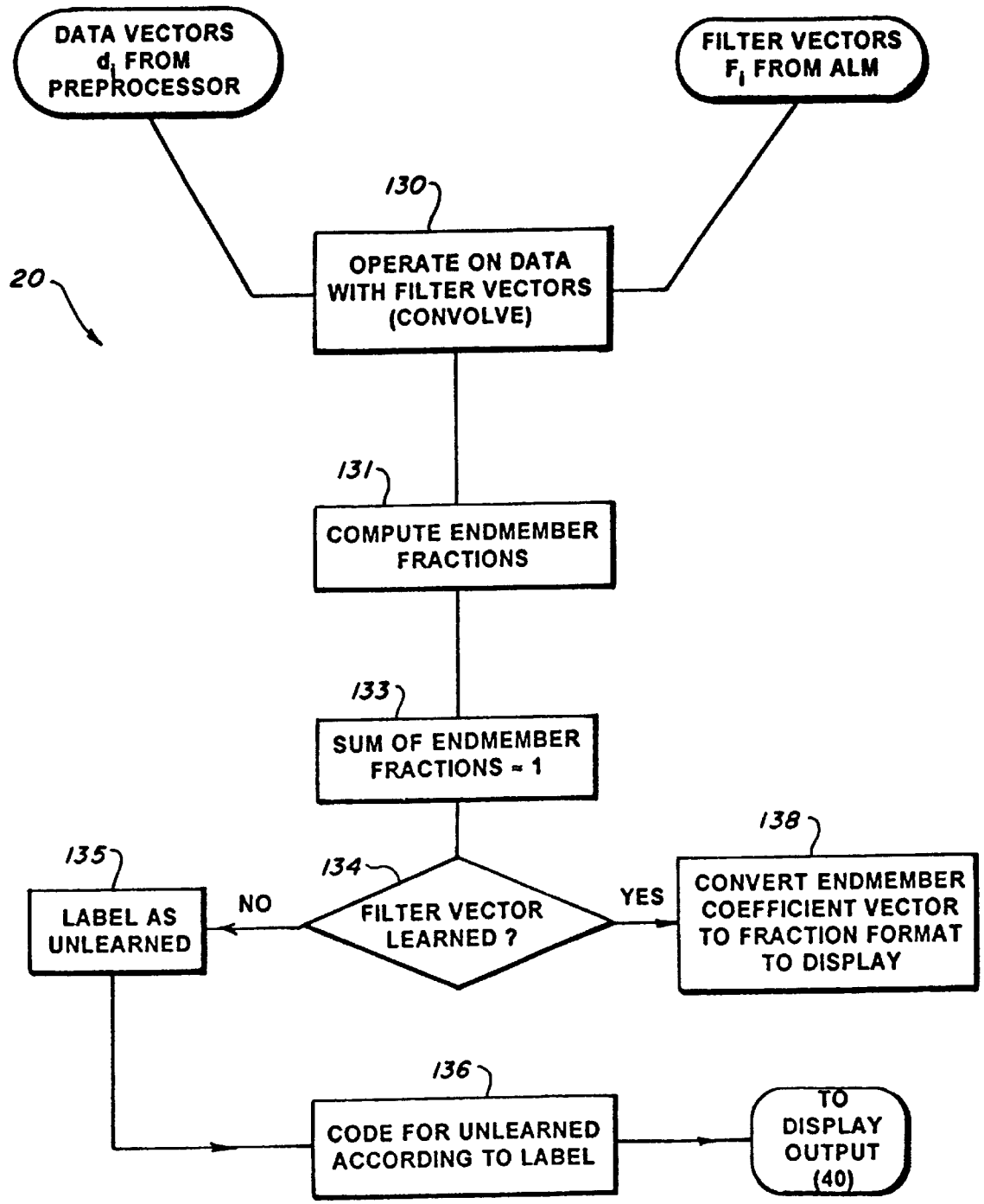
FIG. 13 is a flowchart of the operation of the demixer module.

FIG. 13 illustrates the flowchart for demixer module 20 operation including the demixer module's function in the system's learning process. If the pixel information passed from the preprocessor indicates bad data or an unlearned spectrum 133, 134 demixer module 20 routes that information to the display/output module 40 with a notation of the status of the pixel data 135, 136.

The spectral information, filter vectors, endmember coefficients, and all is passed to the display/output module 40 for display and further processing 138. The spectral characteristics of the data is displayed in terms of endmembers and endmember coefficients in maintaining to the relation:

$$d_k = \sum_{j=1}^{n} c_{jk} E_j + N_k$$

where $d_k$=said data set, $C_{jk}$=said endmemher coefficient and c is≧0, $N_k$=noise and $E_j$=said endmember.

As described above, IHPS uses the exemplar set vectors S as the foundation for describing a scene observed by the hypersensor 10, generating therefrom endmembers E, which are the fundamental constituents of each pixel used to describe the scene sampled by hypersensor 10. A data vector d having a low S/N ratio, when allowed to enter the exemplar set {S}, often have an adverse effect on the systems operation. When a low S/N or otherwise noisy vector d is designated as an exemplar $S_j$, and allowed to infiltrate the exemplar set {S}, the prescreeners ability to discriminate new information from repetitive or useless data can be compromised. This may happen because an exemplar S containing a high content of noise is will most certainly be characterized by the prescreener 50 as dissimilar from most of the other data vectors including other noise corrupted data causing a breakdown in the prescreeners ability to discard repetitive data. Thus, when the system samples a succession of noisy data or a noisy cluster of data, prescreener 50 may become confused, and the ability of the prescreener to make accurate decisions on whether a match condition exist between d and S is compromised.

The SERENE technique greatly curtails this phenomena, by filtering out data vectors with low S/N ratios, thereby preventing the corruption of the exemplar set by adding a degree of resistance to clusters of noisy data the system may encounter.

Noise allowed to enter the system may also have a cumulative effect, causing the endmembers generated from a noisy exemplar to be inaccurate in the sense that noise contained in the exemplar becomes a substantial part of the mixture defined by the endmembers rather than the information signal the exemplar contains. Degradation in the accuracy of the information described by the endmembers causes a reduction in the systems resolution. One way to minimize this effect is to place a limit on the life span of the exemplars, however this necessitates the systems relearning of exemplars periodically because of the shorter exemplar lifespan. This necessarily causes a reduction of the systems on station time in a real time environment.

The exemplars used in a system employing SERENE may be assigned a longer lifespan thereby necessarily extending the systems on station time. A further benefit of reducing the noise in the exemplars S allowed in the exemplar set {S} is the generation of endmembers which more accurately describe each pixel, thus improving systems resolution.

Obviously, many modifications and variations of the present invention are possible in light of the above teachings. For example this invention may be practiced without the use of a parallel processing architecture, or the SERENE technique may be applied to the Prescreener, Gram-Schmidt and Shrink Wrap operations, or combinations of the nonlinear scaled ϵ test, scaled ϵ and the derivative test may be combined with the autocorrelation test within the SERENE technique.

It is therefore understood that, within the scope of the appended claims, the invention may be practiced otherwise than as specifically described.

What is claimed is:

1. A system comprising:
   sensor means for producing endmember vectors responsive to said data vectors,
   said means for producing endmember vectors employing a SERENE technique;
   wherein said means for producing comprises a module adapted to reduce the spanning space of said data vectors by application of a Gram-Schmidt/Salient analysis.

2. A sensor system comprising:
   an exemplar set, said exemplar set comprising exemplar set members;
   a means for generating a data set, said data set comprising data set members wherein;
      said means for generating compares said data set members with respective ones of said exemplar set members effective to characterize said data set members as similar or dissimilar to said exemplar set members in accordance with a SERENE technique, and
   a means for including said data set members characterized as dissimilar in said exemplar set;
   a means for generating the endmember vectors of said exemplar set;
   a means for demixing said data set.

3. The system of claim 2 wherein said means for generating said endmember vectors comprises:
   a prescreener module, said prescreener module characterizing said data set members as similar or dissimilar to survivor set members in accordance to the equation:

$(d_i \cdot S_j > 1-e)$ $d_i$ representing said data set member and $S_j$ representing said survivor set member and e representing a function of said system's sensitivity,
   wherein each of said data set members which fulfill said equation is characterized as dissimilar and included in said survivor set.

4. The system of claim 3 wherein said means for generating said survivor set employs a structured method which allows a minimum number of comparisons of said survivor set members to said data set information by eliminating redundant data in the data set.

5. The system of claim 3 said means for generating further said survivor set comprises a means for managing said survivor set size as a function of age of said survivor set members.

6. The system of claim 2 wherein said means for generating said endmember vectors comprises:
   an adaptive learning module, said adaptive learning module computing endmember and source spectra.

7. The system of claim 6, further comprising:
   a prescreener module, said prescreener module computing a survivor set of data vectors S by screening data in accordance with the equation:

$(d_i \cdot S_j > 1-e)$ where $d_i$ represents a new data vector, $S_j$ represents a data vector from said survivor set member, and e represents a system sensitivity function;

wherein said adaptive learning module computes endmember and source spectra by performing a Gram-Schmidt/Salient analysis of said survivor set, defining a reduced dimensional spanning space and projecting said survivor set into said reduced dimensional spanning space by:
   a) designating the two survivor set vectors contained in said survivor set farthest apart
   b) generating an orthogonal basis set in the plane defined by said two survivor set vectors;
      c) selecting the salient relating to said plane defined by said orthogonal basis set;
   d) generating a new othogonal basis set based on said salient selected in step (c), said new othogonal basis set defining a multi-dimensional volume wherein the distance between said salient selected in step (c) and said multidimensional volume defines an error;
   continuing steps (c)–(d) until said error falls within a desired range.

8. The system of claim 7 wherein said adaptive learning module further defines a optimized hyper triangle, by performing a shrink wrap minimization of an objective function designated to optimize the hyper triangle in the reduced dimensional spanning space, said shrink wrap minimization fulfilling to the condition that the vector information contained in said reduced dimensional spanning space is also contained within said optimized hyper triangle.

9. The system of claim 8 wherein said adaptive learning module computes said endmembers by defining said endmembers as the vertices of said optimized hyper triangle.

10. The system of claim 8 wherein said optimized hyper triangle is defined by using filter vectors to perform shrink wrap minimization.

11. The system of claim 2 wherein the means for generating a data set is a hypersensor.

12. The system of claim 2 wherein said means for generating the endmember vectors further comprises a means to compute filter vectors in accordance with the equation:

$F_i \cdot E_j = \delta_{ij}$ $F_i$ representing said filter vectors, E representing said endmembers and $\delta=1$ if i=j, otherwise $\delta=0$.

13. The system of claim 2 wherein said means for demixing comprises a demixing module, said demixing module convolving said data set and computing endmember coefficients in accordance with the equation:

$$F_J \cdot d_k = \sum_{j=1}^{n} c_{jk} F_J \cdot E_j + F_J \cdot N_K \approx c_{Jk}$$

$F_j$ representing a filter vector, $d_k$ representing said data set, $c_{jk}$ said endmember coefficient, $N_k$ representing a noise vector and E representing said endmember.

14. The system of claim 2 wherein said means for generating endmember vectors characterizes said data members as similar or dissimilar by:
   a) performing an autocorrelation test on said data number;
   b) determining whether said data member is within predefined noise parameters;
   c) if said data member is within said noise parameters characterize said data member as similar and get next data member, otherwise;
   d) perform a scaled $\epsilon$ test on said data member;
   e) determine whether said data member is within said noise parameters;

f) if said data member is within said noise parameters characterize said data member as similar and get next data member, otherwise;

g) perform an autocorrelation test on the difference between said data member and said exemplar set member;

h) determine whether said data member is within said noise parameters;

i) if said data member is within said noise parameters characterize said data member as similar and go to step (a), otherwise;

j) repeat steps (e)–(i) until said exemplar set members are exhausted;

k) add said data member to a survivor set, l) get next data member and continue steps (a)–(l) until noise fails to within a desired range.

15. The system of claim 2 wherein said means for generating endmember vectors characterizes said data members as similar or dissimilar by:

a) performing a derivative test on said data member;

b) determining whether said data member is within predefined noise parameters;

c) if said data member is within said noise parameters characterize said data member as similar and get next data member, otherwise;

d) perform a scaled a test on said data member;

e) determine whether said data member is within said noise parameters;

f) if said data member is within said noise parameters characterize said data member as similar and get next data member, otherwise;

g) perform a derivative test on the difference between said data member and said exemplar set member;

h) determine whether said data member is within said noise parameters;

i) if said data member is within said noise parameters characterize said data member as similar and go to step (a), otherwise;

j) repeat steps (e)–(j) until said exemplar set member are exhausted;

k) add said data member to a survivor set, l) get next data member and continue steps (a)–(l) until noise falls to within a desired range.

16. An optical sensor system comprising;

a means for collecting spectral data, an adaptive learning module, said adaptive learning module computing endmember and source spectra by performing Gram-Schmidt/Salient analysis of said spectral data, said analysis defining a reduced dimensional spanning space by:

a) designating the two vectors contained in said data farthest apart b) generating an orthogonal basis set in the plane defined by said orthogonal basis set;

c) selecting the salient relating to said plane defined by said orthogonal basis set;

d) generating a new orthogonal basis set based on the salient selected in step (c) said new orthogonal basis set defining a multi-dimensional volume, wherein the distance between said salient selected in step (c) and said multi-dimensional volume defines an error;

continue steps (c)–(d) until said error falls within an acceptable range;

said adaptive learning module further performing minimization of a convex manifold within said multi-dimensional volume subject to the condition that all vector information from said spectral data is contained within a minimized hyper triangle, wherein said endmembers are defined by the vertices of said minimized hyper triangle;

said adaptive learning module computing filter vectors in accordance with the equation:

$$F_i \cdot E_j = \delta_{ij}$$

subject to the condition that $\delta_{ij}=1$ if $i=j$ and $\delta_{ij}=0$ otherwise, where $F_i$=said filter vector and $E_i$=said endmember, a demixer module, said demixer module comprising a means to compute an endmember coefficient in accordance with the equation, $$F_j \cdot d_k = \Sigma c_{jk} F_j \cdot E_j + F_j \cdot N_k = c_{jk}$$

where $F_j$=said filter vector, $d_k$=said data set, $c_{jk}$=said endmember coefficient, $N_k$=noise and $E_j$=said endmember;

a means to further process and display the spectral characteristics of said data set in terms of said endmembers and endmember coefficients said processing in accordance with the equation $$d_k = \Sigma c_{jk} E_j + N_k$$

where $d_k$=said data set, $c_{jk}$=said endmember coefficient and is $\geq 0$, $N_k$=noise and $E_j$=said endmember.

17. An optical sensor system comprising;

a means for collecting optical spectral data, a means for converting said optical spectral data into a minimized set of data vectors comprising:

a prescreener module, said prescreener module computing a survivor set of data vectors S by screening data in accordance with the equation $$(d_i \cdot S_j > 1-e)$$

where $d_i$ represents a new data vector and $S_j$ represents a data vector from a survivor set;

an adaptive learning module, said adaptive learning module computing endmembers and source spectra by performing Gram-Schmidt/Salient analysis of said survivor set, said analysis defining a reduced dimensional spanning space by:

a) designating the two survivor set vectors contained in said survivor set farthest apart;

b) generating an orthogonal basis set in the plane defined by said two survivor set vectors;

c) selecting the salient relating to said plane defined by said orthogonal basis set;

d) generating a new orthogonal basis set based on the salient selected in step (c), said new orthogonal basis set defining a multi-dimensional volume;

wherein the distance between said salient selected in step (c) and said multi-dimensional volume defines an error;

continue steps (c)–(d) until said error falls within an acceptable range, said adaptive learning module further performing minimization of a convex manifold within said multi-dimensional volume subject to the condition that all vector information from said survivor set is contained within a minimized hyper triangle, wherein said endmembers are defined by the vertices of said minimized hyper triangle, said adaptive learning module computing said filter vectors in accordance with the equation $$F_i \cdot E_j = \delta_{ij}$$

subject to the condition that $\delta_{ij}=1$ if i=j and $\delta_{ij}=0$ otherwise, where $F_i$=said filter vector and E=said endmember;

a demixer module;

said demixer module comprising a means to compute an endmember coefficient in accordance with the equation $$F_j \cdot d_k = \Sigma c_{jk} F_j \cdot E_j + F_j \cdot N_k \approx c_{jk}$$

where $F_j$=said filter vector, $d_k$=said data set, $c_{jk}$=said endmember coefficient, $N_k$=noise and $E_j$=said endmember;

a means to further process and display the spectral characteristics of said data set in terms of said endmembers and endmember coefficients said processing in accordance with the equation $$d_k = \Sigma c_{jk} E_j + N_k$$

where $d_k$=said data set, $c_{jk}$=said endmember coefficient and is $\geq 0$, $N_k$=noise and $E_j$=said endmember.

18. A method for processing hyperspectral data comprising:

generating a plurality of data vectors, producing endmember vectors responsive to said data vectors, producing endmember vectors by employing a SERENE technique;

wherein said producing means reduces the spanning space of said data vectors by application of a Graham-Schmidt/Salient analysis.

19. A method for processing hyperspectral data comprising:

generating a survivor set, said survivor set comprising survivor set members;

generating a data set, said data set comprising data set members;

comparing said data set members with respective ones of said survivor set members;

characterizing said data set members as similar or dissimilar to said survivor set members in accordance with the SERENE technique, and including said data set members characterized as dissimilar in said survivor set.

20. A system comprising:

sensor means for generating a plurality of data vectors from a physical object;

means for producing endmember vectors responsive to said data vectors, said means for producing being adapted to reduce the spanning space of said data vectors by application of the Graham-Schmidt algorithm using salients;

said system further comprising at least one filter means for identifying noisy ones of said data vectors.

21. The system of claim 20, wherein said at least one filter means comprises means for autocorrelating said data vectors, and determining whether said autocorrelation is greater than a preselected threshold.

22. The system of claim 21, wherein said threshold is $1-d_{obs}/(d_{obs}+N)$, where $d_{obs}$ is the magnitude of one of said data vectors, and N is an estimate of the noise in said data vectors.

23. The system of claim 20, wherein said filter means comprises means for estimating the noise in said data vectors from the autocorrelation index of said vectors.

24. The system of claim 20, wherein said filter means comprises means for performing an element by element derivative of said data vectors.

25. A method comprising:

generating a plurality of data vectors from a physical object;

producing endmember vectors responsive to said data vectors, said producing being effective to reduce the spanning space of said data vectors by application of the a Gram-Schmidt/Salient analysis;

said method further comprising identifying noisy ones of said data vectors.

26. The method of claim 25, further comprising autocorrelating said data vectors, and determining whether said autocorrelation is greater than a preselected threshold.

27. The method of claim 26, wherein said threshold is $1-d_{obs}/(d_{obs}+N)$, where $d_{obs}$ is the magnitude of one of said data vectors, and N is an estimate of the noise in said data vectors.

28. The method of claim 25, further comprising estimating the noise in said data vectors from the autocorrelation index of said vectors.

29. The method of claim 25, further comprising performing an element by element derivative of said data vectors.

* * * * *